US012661901B2

(12) United States Patent
Oki et al.

(10) Patent No.: US 12,661,901 B2
(45) Date of Patent: Jun. 23, 2026

(54) INK CONTAINER AND SYSTEM

(71) Applicant: BROTHER KOGYO KABUSHIKI KAISHA, Nagoya (JP)

(72) Inventors: Satoru Oki, Nagoya (JP); Masahiro Hayashi, Anjo (JP); Naoya Okazaki, Hashima (JP); Yuma Tanabe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 38 days.

(21) Appl. No.: 18/398,462

(22) Filed: Dec. 28, 2023

(65) Prior Publication Data

US 2025/0042167 A1 Feb. 6, 2025

(30) Foreign Application Priority Data

Jul. 31, 2023 (JP) ................................ 2023-124420
Jul. 31, 2023 (JP) ................................ 2023-124421
Jul. 31, 2023 (JP) ................................ 2023-124422
Jul. 31, 2023 (JP) ................................ 2023-124423
Jul. 31, 2023 (JP) ................................ 2023-124427
Jul. 31, 2023 (JP) ................................ 2023-124428
(Continued)

(51) Int. Cl.
*B41J 2/175* (2006.01)

(52) U.S. Cl.
CPC ......... *B41J 2/17553* (2013.01); *B41J 2/1752* (2013.01); *B41J 2/17523* (2013.01);
(Continued)

(58) Field of Classification Search
CPC .... B41J 2/175; B41J 2/17503; B41J 2/17506; B41J 2/17509; B41J 2/17513;
(Continued)

(56) References Cited

U.S. PATENT DOCUMENTS 8,425,008 B2 4/2013 Kudo et al.
2002/0057317 A1 5/2002 Cowger et al.
(Continued)

FOREIGN PATENT DOCUMENTS

EP 1 053 875 A1 11/2000
EP 1 199 178 A1 4/2002
(Continued)

OTHER PUBLICATIONS

Office Action issued in corresponding European Application No. 23 209 645.3, Oct. 14, 2024.
(Continued)

*Primary Examiner* — Anh T Vo
(74) *Attorney, Agent, or Firm* — Merchant & Gould P.C.

(57) ABSTRACT

An ink container includes a main body, a lower surface, and a guide wall. The main body includes a chamber configured to store ink. The main body has first and second sidewalls spaced apart from one another to define a first width. The supply port faces frontward in an attachment direction of the ink container and is configured to supply ink from the chamber. The lower surface is positioned above the supply port in an up-down direction, and forward of the supply port in the attachment direction of the ink container.

20 Claims, 18 Drawing Sheets

(30) Foreign Application Priority Data

| | | |
|---|---|---|
| Nov. 14, 2023 | (EP) | 23209642 |
| Nov. 14, 2023 | (EP) | 23209645 |
| Nov. 14, 2023 | (EP) | 23209648 |
| Nov. 14, 2023 | (EP) | 23209668 |
| Nov. 14, 2023 | (EP) | 23209675 |
| Nov. 14, 2023 | (EP) | 23209682 |
| Dec. 15, 2023 | (JP) | 2023-211881 |
| Dec. 15, 2023 | (JP) | 2023-211882 |
| Dec. 15, 2023 | (JP) | 2023-211883 |
| Dec. 15, 2023 | (JP) | 2023-211884 |
| Dec. 15, 2023 | (JP) | 2023-211885 |
| Dec. 15, 2023 | (JP) | 2023-211886 |

(52) U.S. Cl.
CPC ......... *B41J 2/17526* (2013.01); *B41J 2/1753* (2013.01); *B41J 2/17596* (2013.01); *B41J 2/1754* (2013.01)

(58) Field of Classification Search
CPC .. B41J 2/1752; B41J 2/17523; B41J 2/17526; B41J 29/02; B41J 2/1753; B41J 2/1754; B41J 2/17553; B41J 2/17596; B41J 2002/17516; B41J 29/13
See application file for complete search history.

(56) References Cited

U.S. PATENT DOCUMENTS

| | | | | |
|---|---|---|---|---|
| 2002/0071011 | A1* | 6/2002 | Hayashi | B41J 2/17566 347/86 |
| 2002/0118262 | A1 | 8/2002 | Seino et al. | |
| 2002/0158943 | A1 | 10/2002 | Powell et al. | |
| 2005/0024453 | A1 | 2/2005 | Steinmetz et al. | |
| 2007/0268344 | A1 | 11/2007 | Anderson et al. | |
| 2013/0050359 | A1 | 2/2013 | Kanbe et al. | |
| 2014/0192119 | A1 | 7/2014 | Boyd et al. | |
| 2016/0279958 | A1 | 9/2016 | Wang et al. | |
| 2016/0279959 | A1 | 9/2016 | Okazaki et al. | |
| 2016/0279960 | A1 | 9/2016 | Okazaki et al. | |
| 2018/0178527 | A1 | 6/2018 | Miyao | |
| 2018/0178535 | A1 | 6/2018 | Tomoguchi | |
| 2023/0045050 | A1 | 2/2023 | Oki et al. | |
| 2023/0058199 | A1 | 2/2023 | Ishibe | |
| 2023/0234368 | A1 | 7/2023 | Ono et al. | |
| 2023/0278340 | A1 | 9/2023 | Oki | |
| 2023/0398783 | A1 | 12/2023 | Nagashima et al. | |

FOREIGN PATENT DOCUMENTS

| | | | |
|---|---|---|---|
| EP | 1 259 380 | A1 | 11/2002 |
| EP | 2 607 088 | A2 | 6/2013 |
| EP | 2 783 863 | A2 | 10/2014 |
| EP | 3 112 167 | A1 | 1/2017 |
| EP | 3 437 873 | A1 | 2/2019 |
| EP | 3 960 471 | A1 | 3/2022 |
| EP | 4 155 086 | A1 | 3/2023 |
| JP | 9-174879 | A | 7/1997 |
| JP | 10-86408 | A | 4/1998 |
| JP | 2002-292905 | A | 10/2002 |
| JP | 2003-25608 | A | 1/2003 |
| JP | 2006-56118 | A | 3/2006 |
| JP | 2006-056118 | A | 3/2006 |
| JP | 2007-500618 | A | 1/2007 |
| JP | 2013-49168 | A | 3/2013 |
| JP | 2016-185643 | A | 10/2016 |
| JP | 2016-185647 | A | 10/2016 |
| JP | 2018-103565 | A | 7/2018 |
| JP | 2023-22950 | A | 2/2023 |
| WO | 2017-006364 | A1 | 1/2017 |
| WO | 2022/091759 | A1 | 5/2022 |

OTHER PUBLICATIONS

Office Action issued in corresponding European Application No. 23 209 648.7, Oct. 14, 2024.
Extended European Search Report issued in corresponding European Application No. 23209682.6 , Mar. 21, 2024.
Extended European Search Report issued in corresponding European Application No. 23209675.0, May 3, 2024.
Extended European Search Report issued in corresponding European Application No. 23209668.5, Apr. 15, 2024.
Extended European Search Report issued in corresponding European Application No. 23209648.7, Apr. 10, 2024.
Extended European Search Report issued in corresponding European Application No. 23209645.3, May 22, 2024.
Extended European Search Report issued in corresponding European Application No. 23209642.0, Mar. 15, 2024.

* cited by examiner

INK CONTAINER AND SYSTEM

REFERENCE TO RELATED APPLICATIONS

This application is based upon and claims the benefit of priority to Japanese Patent Application No. 2023-124420, filed on Jul. 31, 2023, Japanese Patent Application No. 2023-124422, filed on Jul. 31, 2023, Japanese Patent Application No. 2023-124421, filed on Jul. 31, 2023, Japanese Patent Application No. 2023-124427, filed on Jul. 31, 2023, Japanese Patent Application No. 2023-124423, filed on Jul. 31, 2023, Japanese Patent Application No. 2023-124428, filed on Jul. 31, 2023, European Patent Application No. 23209642.0, filed on Nov. 14, 2023, European Patent Application No. 23209645.3, filed on Nov. 14, 2023, European Patent Application No. 23209648.7, filed on Nov. 14, 2023, European Patent Application No. 23209668.5, filed on Nov. 14, 2023, European Patent Application No. 23209675.0, filed on Nov. 14, 2023, European Patent Application No. 23209682.6, filed on Nov. 14, 2023, Japanese Patent Application No. 2023-211881, filed on Dec. 15, 2023, Japanese Patent Application No. 2023-211882, filed on Dec. 15, 2023, Japanese Patent Application No. 2023-211883, filed on Dec. 15, 2023, Japanese Patent Application No. 2023-211884, filed on Dec. 15, 2023, Japanese Patent Application No. 2023-211885, filed on Dec. 15, 2023, and Japanese Patent Application No. 2023-211886, filed on Dec. 15, 2023. The entire disclosures of all of the above applications are incorporated herein by reference.

BACKGROUND ART

The present disclosure relates to an ink container and a system each of which is for storing ink.

An ink cartridge to be attached to a cartridge attachment portion of a printer is known. When the ink cartridge is attached to the cartridge attachment portion, a supply port of the ink cartridge is connected to an ink supply tube provided in the printer.

SUMMARY

The ink container may include a main body having first and second sidewalls spaced apart from one another to define a first width and a guide wall defining a second width smaller than the first width. The guide wall may be positioned within the first width defined by the first and second sidewalls. In such a configuration of the ink container, direct collision of the guide wall with the floor or the like is suppressed when the ink container falls onto the floor or the like.

BRIEF DESCRIPTION OF DRAWINGS

FIG. 13A is a cross-sectional view of the ink cartridge 30 and the cartridge case 110, taken along a vertical plane intersecting a lower surface 70 of the ink cartridge 30.

FIG. 13B is a cross-sectional view of the ink cartridge 30 and the cartridge case 110, taken along a vertical plane intersecting a first key portion 77 of the ink cartridge 30.

FIG. 14A is a cross-sectional view of the ink cartridge 30 and the cartridge case 110, taken along a vertical plane intersecting a lower surface 70 of the ink cartridge 30.

FIG. 14B is a cross-sectional view of the ink cartridge 30 and the cartridge case 110, taken along a vertical plane intersecting a first key portion 77 of the ink cartridge 30.

FIG. 15A is a cross-sectional view of the ink cartridge 30 and the cartridge case 110, taken along a vertical plane intersecting a lower surface 70 of the ink cartridge 30.

FIG. 15B is a cross-sectional view of the ink cartridge 30 and the cartridge case 110, taken along a vertical plane intersecting a first key portion 77 of the ink cartridge 30.

FIG. 16A is a cross-sectional view of the ink cartridge 30 and the cartridge case 110, taken along a vertical plane intersecting a lower surface 70 of the ink cartridge 30.

FIG. 16 is a cross-sectional view of the ink cartridge 30 and the cartridge case 110, taken along a vertical plane intersecting a first key portion 77 of the ink cartridge 30.

DESCRIPTION

Figure 1:
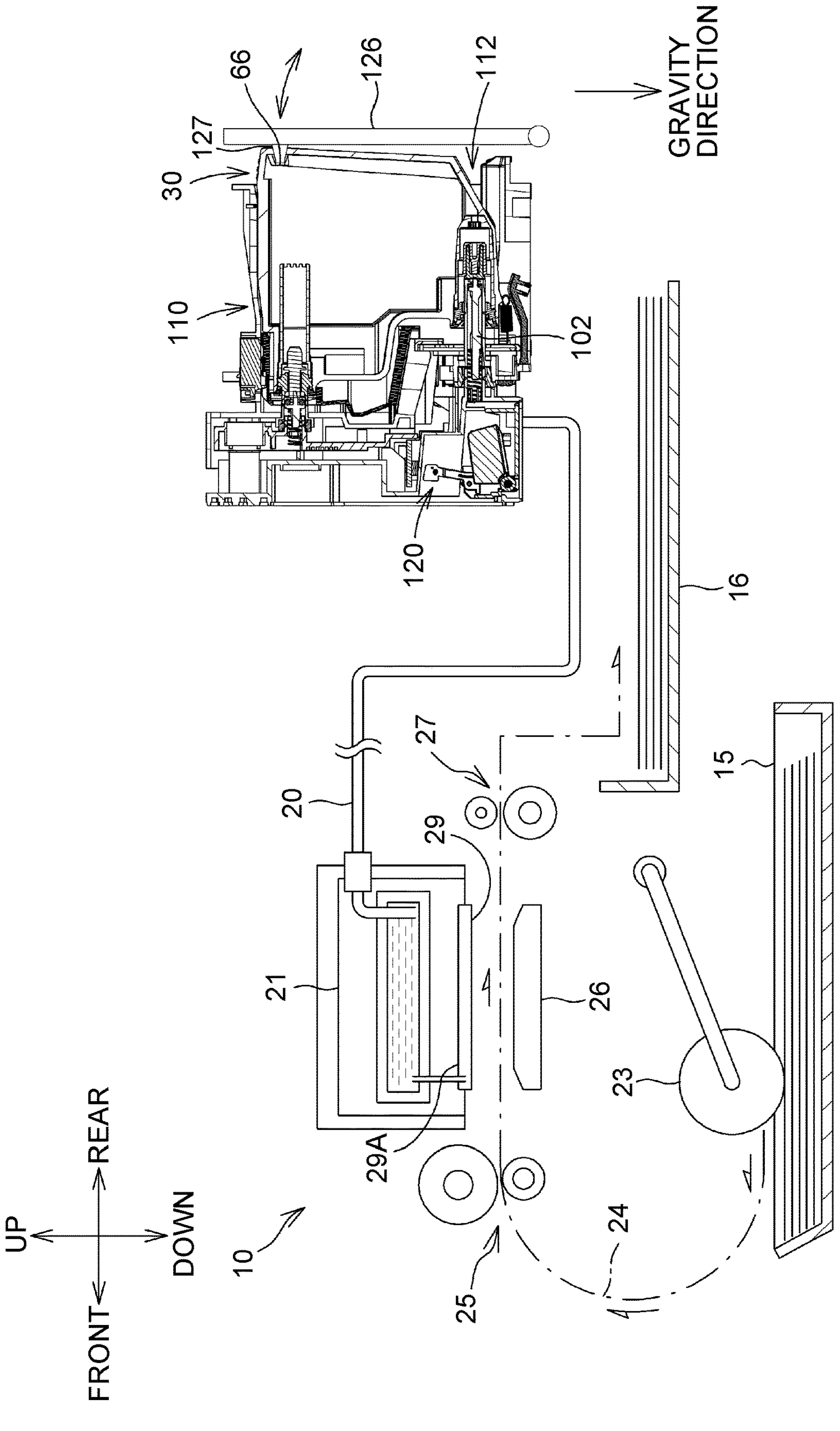
FIG. 1 is a longitudinal sectional view schematically showing an internal structure of a printer 10.

An ink cartridge to be attached to a cartridge attachment portion of a printer is known. When the ink cartridge is attached to the cartridge attachment portion, a supply port of the ink cartridge is connected to an ink supply tube provided in the printer. Further, the ink cartridge is attached to the cartridge attachment portion, the ink cartridge is guided by a guide surface of the cartridge attachment portion such that the positions of the ink supply tube and the ink supply port are aligned. The guide surface of the cartridge attachment portion guides the ink cartridge in an attachment direction by coming into contact with an outermost surface of the ink cartridge such as a lower surface or a side surface.

When the ink cartridge is dropped on the floor, the outermost surface of the ink cartridge such as the lower surface or the side surface may directly collide with the floor. In this case, there is a possibility that the outermost surface is deformed or damaged. If the lower surface or the side surface of the ink cartridge is deformed or damaged, the ink cartridge may not be appropriately guided by the guide surface when the ink cartridge is attached to the cartridge attachment portion.

Hereinafter, embodiments of the present disclosure will be described with reference to the drawings as appropriate.

It should be noted that the embodiment described below is merely an example in which the present disclosure is embodied, and the embodiment can be appropriately changed without departing from the gist of the present disclosure.

In the following, an ink cartridge 30 is inserted into and removed from a cartridge case 110 in a horizontal direction (a direction orthogonal to the gravity direction). Further, whenever appropriate, a frontward direction and a rearward direction may be collectively referred to as a front-rear direction. An upward direction and a downward direction may be collectively referred to as an up-down direction. A rightward direction and a leftward direction may be collectively referred to as a right-left direction.

The description will be made on the assumption that the front-rear direction and the right-left direction are horizontal directions. Further, a vertical direction orthogonal to the front-rear direction is defined as the up-down direction. A direction orthogonal to the up-down direction and the front-rear direction is defined as the right-left direction.

Note that an attached state in which the ink cartridge 30 is attached to the cartridge case 110 is a state in which the ink cartridge 30 has been inserted to an attachment position in the cartridge case 110 and is ready to be used with the printer 10. The attachment position is a position at which a supply tube 102 provided in the cartridge case 110 is inserted into a supply port 34 provided in the ink cartridge 30 and is connected to the supply port 34. Hereinafter, the posture of the ink cartridge 30 when the ink cartridge 30 is in the attached state and is ready to be used with the printer 10 is referred to as a usage posture or an upright posture.

Unless otherwise specified, when the positional relations between the components of the ink cartridge 30 are described with the terms "up", "down", "left", "right", "front", and "rear" and when the orientations or directions of the components of the ink cartridge 30 are described with the terms "up", "down", "left", "right", "front", and "rear", such descriptions are made based on when the ink cartridge 30 is in the usage posture. Moreover, when the positions, orientations or directions of the ink cartridge 30 itself is described with the terms "up", "down", "left", "right", "front", and "rear", such descriptions are made based on when the ink cartridge 30 is in the usage posture.

The ink cartridge 30 is inserted into the cartridge case 110 in the frontward direction, which direction may be referred to as an attachment direction. The ink cartridge 30 is removed from the cartridge case 110 in the rearward direction. When it is described that a component of the ink cartridge 30 faces a certain direction, the direction in which the component faces is not strictly limited to that certain direction only.

For example, when it is described that "a front surface faces frontward", the front surface may face frontward and upward. A front surface of the ink cartridge 30 is a surface appearing in the front view shown in FIG. 8. A rear surface of the ink cartridge 30 is a surface appearing in the rear view shown in FIG. 9. An upper surface of the ink cartridge 30 is a surface appearing in the plan view shown in FIG. 6. A lower surface of the ink cartridge 30 is a surface appearing in the bottom view shown in FIG. 7. A left surface of the ink cartridge 30 is a surface appearing in the left side view shown FIG. 10. A right surface of the ink cartridge 30 is a surface appearing in the right side view shown in FIG. 5.

[Outline of Printer 10]

As shown in FIG. 1, the printer 10 includes the cartridge case 110, a sub-tank 120, an ink tube 20, a recording head 21, and the ink cartridge 30. The printer 10 is an inkjet recording apparatus, for example, an inkjet printer that records an image by ejecting ink droplets from the recording head 21 onto a sheet on the basis of an inkjet recording method. The printer 10 includes the cartridge case 110. The cartridge case 110 is an example of an attachment unit.

The ink cartridge 30 is configured to be attached to the cartridge case 110. The ink cartridge 30 is an example of an ink container. The cartridge case 110 has an opening 112 at its rear end. The ink cartridge 30 is configured to be inserted frontward into the case 110 through the opening 112 and to be attached to the case 110 when the ink cartridge 30 reaches the attachment position. The ink cartridge 30 is configured to be detached and removed rearward from the case 110 through the opening 112. The opening 112 is covered by a cover 126 when the cover 126 is closed and is exposed to the outside of printer 10 when the cover 126 is opened.

FIG. 1 shows a state in which the ink cartridge 30 is completely attached to the cartridge case 110. That is, FIG. 1 shows the ink cartridge 30 in the attached state. The posture of the ink cartridge 30 in the attached state is the usage posture.

The printer 10 is an example of a system. The ink cartridge 30 stores ink that can be used in the printer 10. The ink may be a liquid containing a coloring material such as a pigment or a processing liquid not containing a coloring material, but containing an additive for improving the quality of image formed by the coloring material. In a state where the ink cartridge 30 is completely attached to the cartridge case 110, that is, when the ink cartridge 30 is in the attached state, the ink cartridge 30 and the recording head 21 are connected to each other via the ink tube 20.

The recording head 21 discharges the ink supplied from the ink cartridge 30 from a plurality of nozzles 29. Specifically, a head control board included in the recording head 21 selectively applies a driving voltage to a plurality of piezoelectric elements 29A provided corresponding to the plurality of nozzles 29. As a result, ink is selectively ejected from the nozzles 29. That is, the recording head 21 consumes the ink stored in the ink cartridge 30 attached to the cartridge case 110.

The printer 10 includes a paper feed tray 15, a paper feed roller 23, a pair of conveyance rollers 25, a platen 26, a pair of discharge rollers 27, and a paper discharge tray 16. The sheet feed roller 23 feeds a sheet on the sheet feed tray 15 toward the conveyance path 24. The sheet fed to the conveyance path 24 reaches the pair of conveyance rollers 25. The pair of conveyance rollers 25 conveys the sheet that has reached the pair of conveyance rollers 25 onto the platen 26. The recording head 21 selectively ejects ink onto the sheet passing over the platen 26. Thus, an image is recorded on the sheet. The sheet having passed through the platen 26 reaches the pair of discharge rollers 27. The pair of discharge rollers 27 discharges the sheet that has reached the pair of discharge rollers 27 to the discharge tray 16 positioned at the most downstream end of the conveyance path 24.

[Cartridge Case 110]

Figure 2:
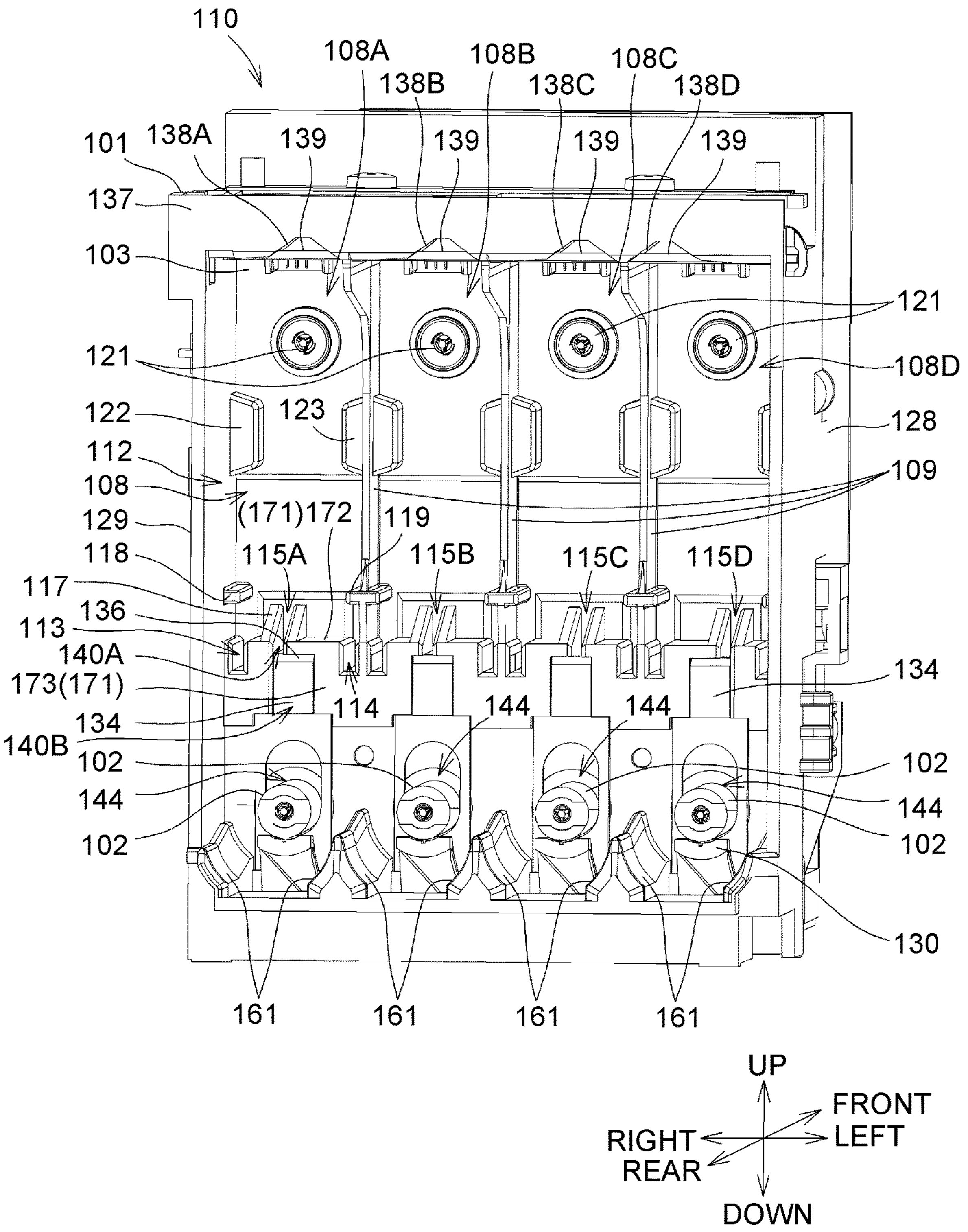
FIG. 2 is a rear perspective view of a cartridge case 110.

As shown in FIG. 2, the cartridge case 110 includes a case body 101 and a supply tube 102. The case body 101 is an example of an attachment unit. The case body 101 has a box shape. The case body 101 has an internal space to which the ink cartridge 30 is attached. The case body 101 has an end surface 103 that defines a front end in the attachment direction when the ink cartridge 30 is attached to the internal space, a left wall that defines a left end of the internal space, a right wall that defines a right end of the internal space, a lower wall, and a cover wall 171 that covers a pressing plate 134 described later. The cover wall 171 includes an upper wall 172 facing upward and a rear wall 173 extending downward from a rear end portion of the upper wall 172. The case body 101 has the opening 112 at its rear end. When the user opens the cover 126 to use the printer 10, the opening 112 is exposed.

The case body 101 has three partition walls 109 in its internal space. The three partition walls 109 are arranged at intervals in the left-right direction. The slot 108 is an example of an attachment space. The internal space of the case body 101 has four slots 108A, 108B, 108C, and 108D arranged in the left-right direction. The slot 108A is positioned on the rightmost side among the four slots 108A to 108D. The slot 108B is positioned to the left of the slot 108A. The slot 108C is positioned to the left of the slot 108B. The slot 108D is positioned on the left of the slot 108C and on the leftmost side among the four slots 108A to 108D. The internal space of the case body 101 is partitioned into slots 108A, 108B, 108C, and 108D by three partition walls 109 that partition the internal space of the case body 101 and by the inner surface of the case body 101. The partition wall 109 extends upward from the upper surface of the upper wall 172 of the cover wall 171.

Three partition walls 109 are positioned at equal intervals in the left-right direction. The partition wall 109 has a flat plate shape extending in the up-down direction and the left-right direction. The partition wall 109 extends from the front end to the rear end of the upper wall 172.

The case body 101 has a guide surface 161. The guide surface 161 is arranged in the internal space of each of the slots 108A, 108B, 108C, and 108D. The guide surface 161 faces upward. The guide surface 161 is generally a semi-circumferential surface. When the ink cartridge 30 is attached to or detached from the case body 101, the guide surface 161 guides the ink cartridge 30 in the front-rear direction. The guide surface 161 supports the lower end of the ink cartridge 30 in the attached state where the ink cartridge 30 is attached to the case body 101.

Figure 13A:
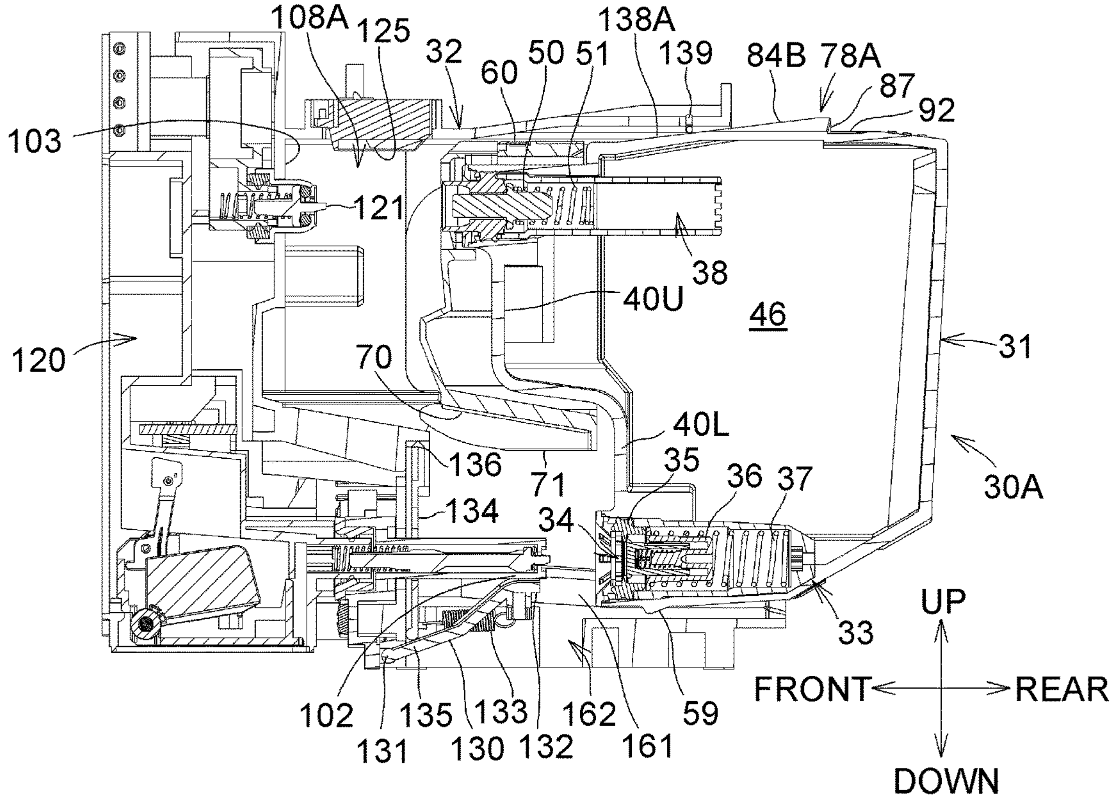
FIGS. 13A and 13B are cross-sectional views of the ink cartridge 30 and the cartridge case 110, each showing a state where the ink cartridge 30 is positioned in the cartridge case 110 and an ink receiving member 130 is positioned at a first position.
Figure 13B:
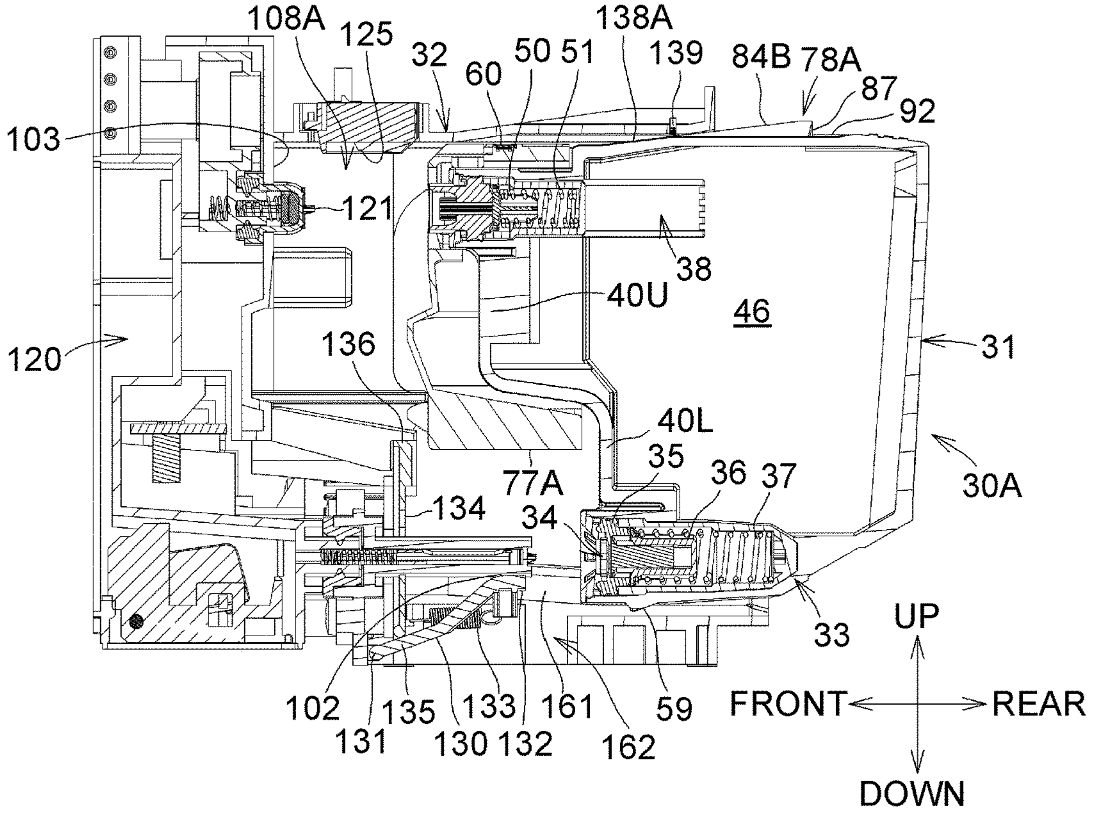

As shown in FIGS. 13A and 13B, a space 162 exists below the supply tube 102.

As shown in FIG. 2, the cover wall 171 is positioned below the end surface 103 of the case body 101. The upper wall 172 has a flat plate shape extending in the front-rear direction and the left-right direction. The upper wall 172 extends from the left wall to the right wall of the case body 101. The rear wall 173 has a flat plate shape extending in the up-down direction and the left-right direction. The rear wall 173 extends from the left wall to the right wall of the case body 101. In the rear wall 173, through holes 144 are positioned at equal intervals in the left-right direction in the respective slots 108A, 108B, 108C, and 108D. The guide surface 161 is positioned below the through hole 144. The supply tube 102 passes through the through hole 144 and protrudes rearward from the rear wall 173.

In each slot 108A, 108B, 108C, 108D, the top wall 172 has a groove 113 and a groove 114.

The groove 113 and the groove 114 in each of the slots 108A, 108B, 108C, and 108D have a common shape. The groove 113 is positioned at the left end of each of the slots 108A, 108B, 108C, 108D, and the groove 114 is positioned at the right end. Both the groove 113 and the groove 114 are recessed downward from the upper wall 172 and extend along the front-rear direction so as to be open in the rear wall 173.

The ink cartridge 30 includes a pair of walls (described later) and each wall 71 is inserted into the corresponding one of the groove 113 and the groove 114.

In each of the slots 108A, 108B, 108C, and 108D, two protruding pieces 117 protruding upward from the upper wall 172 of the cover wall 171 and spaced apart from each other in the left-right direction are provided between the groove 113 and the groove 114 in the left-right direction.

The upper wall 172 of the cover wall 171 has a through hole 140A that is continuous with a space between the two protruding pieces 117. The rear wall 173 of the cover wall 171 has a through hole 140B. The lower end of the through hole 140A and the upper end of the through hole 140B are continuous with each other.

A first key slot 115 is positioned between the two protruding pieces 117 in each of the slots 108A, 108B, 108C, 108D. The first key slot 115 is an example of a receiving portion. Specifically, the slot 108A has a first key slot 115A, the slot 108B has a first key slot 115B, the slot 108C has a first key slot 115C, and the slot 108D has a first key slot 115D. The first key slot 115 opens upward and rearward. A first key portion 77 (described later) of the ink cartridge 30 is insertable into the first key slot 115.

The first key slots 115A, 115B, 115C, and 115D have different positions in the left-right direction with respect to the groove 113 and the groove 114. Specifically, the first key slot 115A is closer to the groove 113 than the center of the slot 108A between the groove 113 and the groove 114 in the left-right direction. The first key slot 115B is closer to the groove 114 in the slot 108B than the first key slot 115A is to the groove 114 in the slot 108A in the left-right direction. The first key slot 115C is closer to the groove 114 in the slot 108C than the first key slot 115B is to the groove 114 in the slot 108B in the left-right direction. The first key slot 115D is closer to the groove 114 in the slot 108D than the first key slot 115C is to the groove 114 in the slot 108C in the left-right direction.

In each slot 108A, 108B, 108C, 108D, a rib 118 is positioned above the groove 113 and a rib 119 is positioned above the groove 114. At the slot 108A, the rib 118 protrudes from the inner surface of the right wall 129. At the slot 108B, the rib 118 protrudes from the partition wall 109 defining the right end of the slot 108B. At the slot 108C, the rib 118 protrudes from the partition wall 109 defining the right end of the slot 108C. At the slot 108D, the rib 118 protrudes from the partition wall 109 defining the right end of the slot 108C. At the slot 108A, the rib 119 protrudes from the partition wall 109 defining the left end of the slot 108A. At the slot 108B, the rib 119 protrudes from the partition wall 109 defining the left end of the slot 108B. At the slot 108C, the rib 119 protrudes from the partition wall 109 defining the left end of the slot 108C. At the slot 108D, the rib 119 protrudes from the inner surface of the left wall 128. The ribs 118 and 119 face each other in the left-right direction in each of the slots 108A, 108B, 108C, and 108D.

The supply tube 102 is positioned in the internal space of each of the slots 108A, 108B, 108C, and 108D. The supply tube 102 is positioned below each of the first key slots 115A, 115B, 115C, and 115D. The supply tube 102 has a hollow circular pipe shape. The supply tube 102 extends along the front-rear direction from a sub-tank 120 toward the internal space of each of the slots 108A, 108B, 108C, and 108D. A rear end of the supply tube 102 is opened. The rear end of the supply tube 102 is positioned in the inner space of each of the slots 108A, 108B, 108C, and 108D. Although not described in detail, a valve is disposed in the inner space of the supply tube 102. The valve opens and closes the opening of the supply tube 102. The supply tube 102 is connectable to the supply port 34 of the ink cartridge 30.

As shown in FIG. 1, a front end of the supply tube 102 is connected to the sub-tank 120. The sub-tank 120 has a space that stores the ink supplied from the ink cartridge 30 through the supply tube 102. The internal space of the sub-tank 120 communicates with the outside at the upper portion thereof and is open to the atmosphere. The ink in the sub-tank 120 is supplied to the recording head 21 through the ink tube 20.

Figure 12:
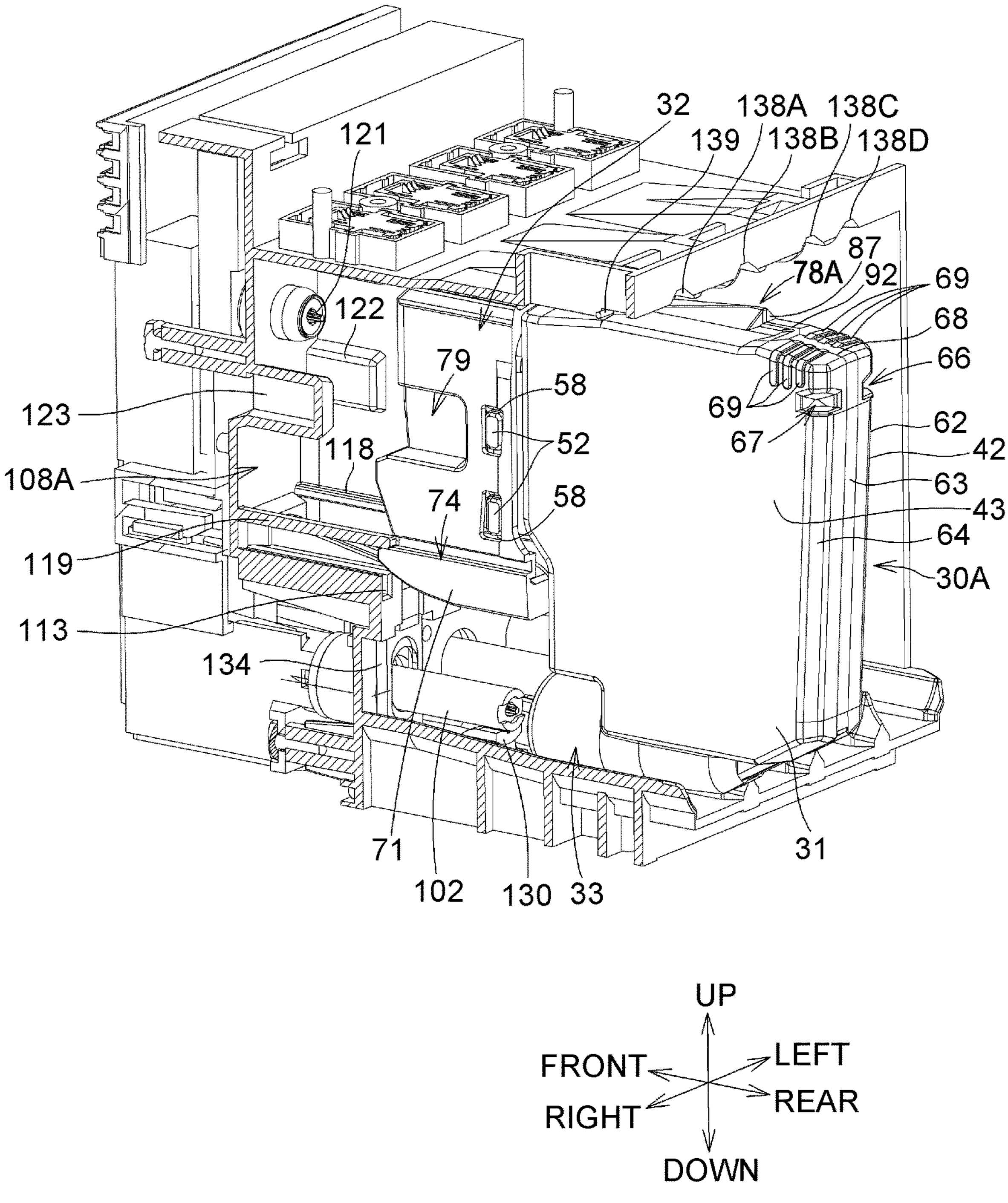
FIG. 12 is a partial cross-sectional perspective view of the ink cartridge 30 and the cartridge case 110, showing a state where the ink cartridge 30 is being inserted into the cartridge case 110.

As shown in FIG. 12, a rod 121 is positioned above each of the first key slots 115A, 115B, 115C, and 115D. The rod 121 protrudes rearward from the end surface 103. The rod 121 is connectable to an atmosphere opening passage 38 of the ink cartridge 30, which will be described later. A fitting piece 122 and a fitting piece 123 are positioned above each of the first key slots 115A, 115B, 115C, and 115D and below the rod 121. The fitting piece 122 is a plate-like member. The fitting piece 122 protrudes leftward from the inner surface of the right wall 129 in the slot 108A. The fitting piece 122 protrudes leftward from the partition wall 109 defining the right end of the slot 108B. The fitting piece 122 protrudes leftward from the partition wall 109 defining the right end of the slot 108C. The fitting piece 122 protrudes leftward from the partition wall 109 defining the right end of the slot 108D. The fitting piece 123 is a plate-like member. The fitting piece 123 protrudes rightward from the partition wall 109 defining the left end of the slot 108A. The fitting piece 123 protrudes rightward from the partition wall 109 defining the left end of the slot 108B. The fitting piece 123 protrudes rightward from the partition wall 109 defining the left end of the slot 108C. The fitting piece 123 protrudes rightward from the inner surface of the left wall 128 in the slot 108D. The fitting piece 122 and the fitting piece 123 face each other in the left-right direction in the slot 108.

As shown in FIG. 13, in each of the slots 108A, 108B, 108C, and 108D, contacts 125 are positioned on the upper inner surface of the case body 101. The contacts 125 are electrically connectable to the IC board 60 of the ink cartridge 30. Through the contacts 125, a controller of the printer 10 reads information stored in the IC board 60 of the ink cartridge 30 and records information in the IC board 60.

As shown in FIG. 13, an ink receiving member 130 is positioned in the space 162 of the case body 101. The ink receiving member 130 is provided for each of the slots 108A, 108B, 108C, and 108D. The ink receiving member 130 has a front end portion 131 extending in the left-right direction. The front end portion 131 is supported by the case body 101. The ink receiving member 130 has a substantially flat plate shape extending rearward and upward from the front end portion 131, and a rear end portion 132 of the ink receiving member 130 is positioned in the vicinity of the rear end of the supply tube 102. The ink receiving member 130 rotates about the front end portion 131 so that the rear end portion 132 moves substantially in the up-down direction. A coil spring 133 extending along the front-rear direction is positioned between the ink receiving member 130 and the case body 101. The coil spring 133 urges, i.e., pulls the rear end portion 132 of the ink receiving member 130 frontward. The coil spring 133 is an example of a second biasing member.

As shown in FIGS. 13A and 13B, the ink receiving member 130 urged, i.e., pulled by the coil spring 133 is held in a state where the rear end portion 132 is the closest to the lower surface of the supply tube 102. In this state, the rear end portion 132 is not in contact with the lower surface of the supply tube 102. The state where the rear end portion 132 of the ink receiving member 130 is the closest to the lower surface of the supply tube 102 is referred to as a closest state of the ink receiving member 130.

In the state where the rear end portion 132 of the ink receiving member 130 is the closest to the lower surface of the supply tube 102, the ink receiving member 130 is positioned at a first position. In a state where the ink cartridge 30 is not attached to the supply tube 102, the ink receiving member 130 is in the closest state but not in contact with the lower surface of the supply tube 102.

After the ink cartridge 30 is removed from the case body 101, ink may remain on the rear end of the supply tube 102. Such ink moves to a lower portion of the rear end of the supply tube 102 due to gravity and thereafter drips to the rear end portion 132 of the ink receiving member 130 which is in the closest state to the lower surface of the supply tube 102. The received ink moves along the ink receiving member 130 from the rear end portion 132 toward the front end portion 131 away from the ink cartridge 30. Since the ink that remains on the rear end of the supply tube 102 is received by the rear end portion 132 of the ink receiving member 130, it is possible to reduce the possibility that the ink adheres to the lower wall of the case body 101.

Figure 14A:
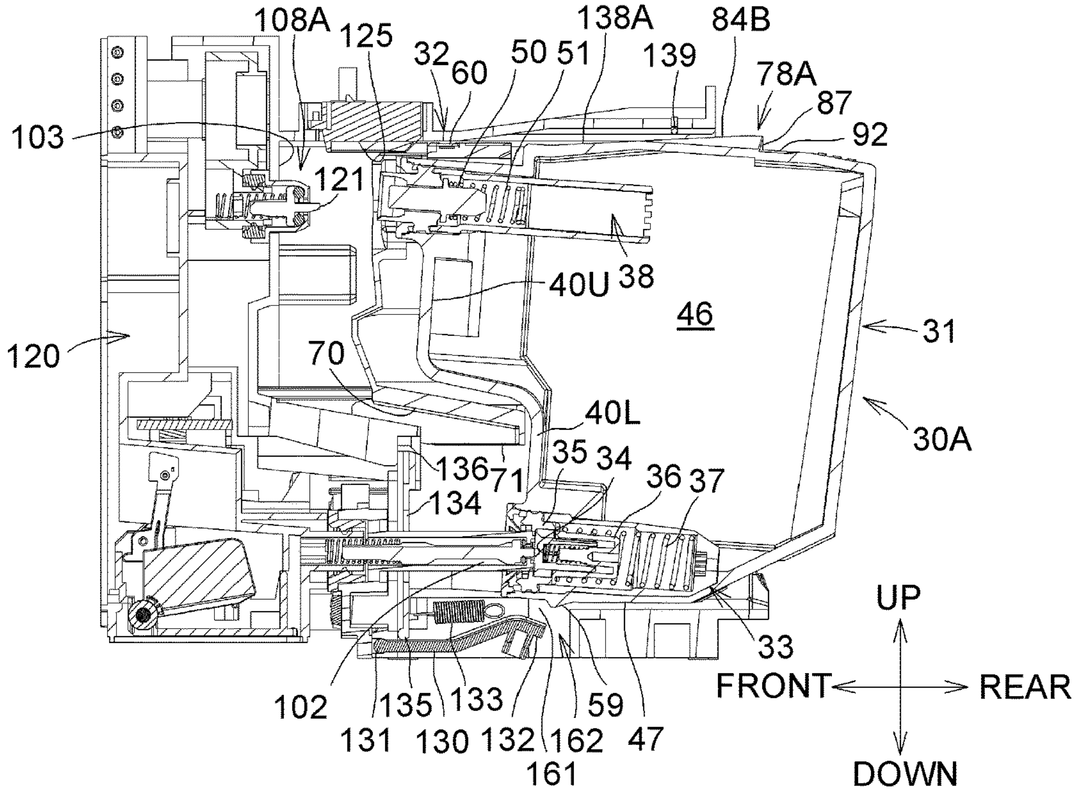
FIGS. 14A and 14B are cross-sectional views of the ink cartridge 30 and the cartridge case 110, each showing a state in which the ink cartridge 30 is positioned in the cartridge case 110 and the ink receiving member 130 is in a second position.
Figure 14B:
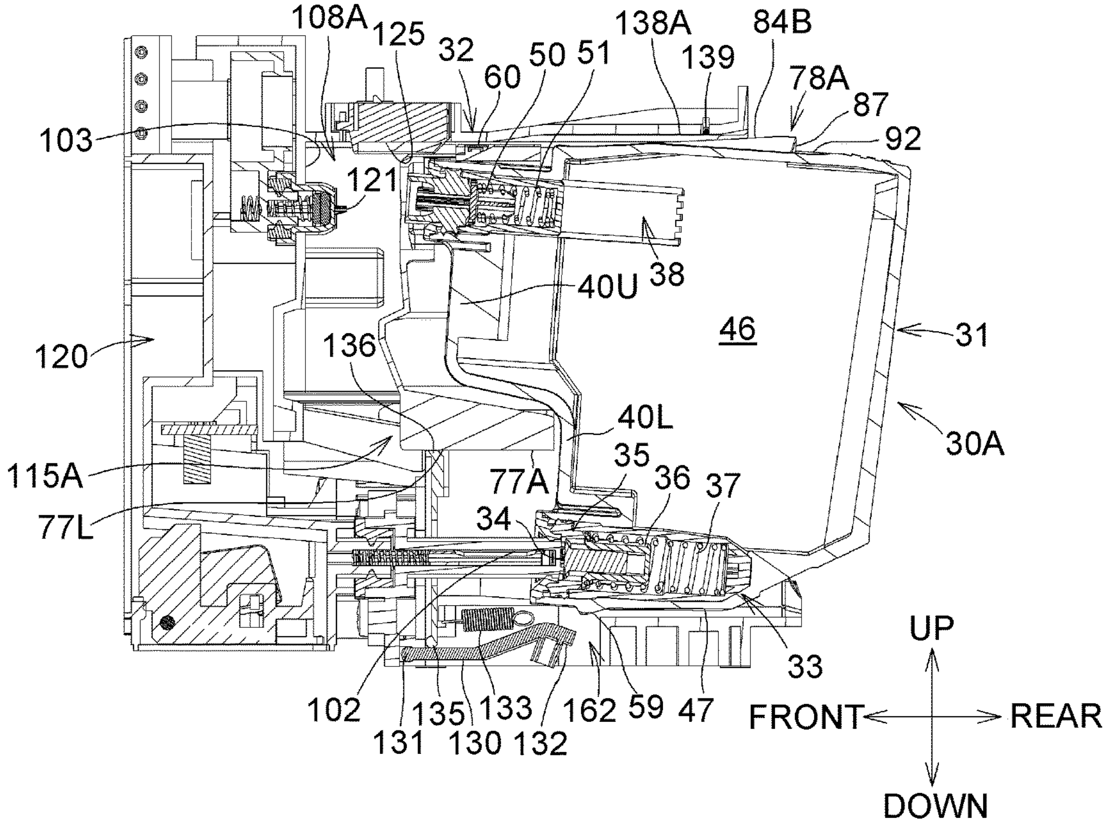

As shown in FIGS. 14A and 14B, in a state where the ink receiving member 130 has moved downward against the pulling force of the coil spring 133, the ink receiving member 130 is in a second position. A space is provided between the ink receiving member 130 at the second position and the supply tube 102 to such an extent that a lower portion of a supply portion 33 of the ink cartridge 30 can be positioned in the space and the supply tube 102 can be received by the supply portion 33. That is, when the supply tube 102 is received in the supply port 34 of the ink cartridge 30 inserted into each of the slots 108A, 108B, 108C, and 108D in the frontward direction, the ink receiving member 130 does not restrict the frontward movement of the ink cartridge 30.

As shown in FIG. 2, the pressing plate 134 is positioned below the cover wall 171 of each of the slots 108A, 108B, 108C, and 108D and in front of the rear wall 173. The pressing plate 134 is supported by the case body 101 so as to be movable in the up-down direction. A lower end 135 of the pressing plate 134 is in contact with the ink receiving member 130 at a portion between the front end portion 131 and the rear end portion 132 of the ink receiving member 130. An upper end 136 of the pressing plate 134 is positioned below the first key slot 115 when the ink cartridge 30 is attached to the cartridge case 110 in the attached state. The pressing plate 134 is positioned below the through hole 140A of the cover wall 171. The pressing plate 134 is positioned in front of the through hole 140B of the rear wall 173.

With this configuration, the pressing plate 134 can come into contact with a first key portion 77 of the ink cartridge 30, which will be described later, through the first key slot 115, the through hole 140A, and the through hole 140B. The pressing plate 134 is held at a lifted position by the ink receiving member 130 urged, i.e. pulled by the coil spring 133.

Although details will be described later, when the first key portion 77 of the ink cartridge 30 enters the first key slot 115, the pressing plate 134 is pressed down by the first key portion 77 against the urging, i.e. pulling force of the coil spring 133. When the pressing plate 134 moves downward, the ink receiving member 130 is movable between the first position and the second position.

As shown in FIG. 2, second key slots 138 are arranged at positions corresponding to the respective slots 108A, 108B, 108C, and 108D in a surface 137 positioned on the upper side of the peripheral edge of the case body 101, which edge defining the opening 112. Specifically, in the case body 101, the slot 108A has a second key slot 138A, the slot 108B has a second key slot 138B, the slot 108C has a second key slot 138C, and the slot 108D has a second key slot 138D. The second key slot 138 is a recess formed in a rear end of a top surface of the case body 101 defining an upper end of the internal space of the case body 101. The second key slot 138 is recessed upward from the top surface. The lower end of the second key slot 138 is continuous with the internal space of the case body 101. A rear end of the second key slot 138 is open toward the outside of the case body 101. A distance between a lower end and an upper end of the opening at the rear end of the second key slot 138 is greater than a distance between a lower end and an upper end of the opening at the front end of the second key slot 138.

In the present embodiment, a distance between the lower end and the upper end of the opening of the second key slot 138 gradually decreases from the rear end of the opening toward the front end of the opening. Alternatively, the distance between the lower end and the upper end of the opening of the second key slot 138 may gradually increase and then gradually decrease from the rear end of the opening toward the front end of the opening. The second key slots 138A, 138B, and 138C are respectively positioned to the left of the center of the slots 108A, 108B, and 108C in the left-right direction. The second key slot 138D is positioned to the right of the center of the slot 108D in the left-right direction. A second key portion 78 of the ink cartridge 30 may enter in at least one of the second key slots 138A, 138B, 138C, and 138D.

A locking portion 139 is positioned in a space that defines the opening of each of the second key slots 138A, 138B, 138C, and 138D. The locking portion 139 is a rod-shaped member extending in the left-right direction. The locking portion 139 comes into contact with a locking surface 87 of the ink cartridge 30 when the ink cartridge 30 is attached to the cartridge case 110 in the attached state.

[Ink Cartridge 30]

The ink cartridge 30 is a container in which ink as a liquid is stored. As shown in FIGS. 3 to 10, the ink cartridge 30 includes a container body 31, a cover 32, and an IC board 60. The container body 31 is an example of a first member. The cover 32 is an example of a second member. The container body 31 and the cover 32 are an example of a main body. The cover 32 covers a front portion of the container body 31. The ink cartridge 30 is inserted frontward into a corresponding one of the slots 108A, 108B, 108C, and 108D with the cover 32 facing the end surface 103 of the case body 101.

The container body 31 has a substantially thin flat cubic shape in which the length in the left-right direction is smaller than the length in the up-down direction and the length in the front-rear direction. The container body 31 includes a supply portion 33 and a second key portion 78. The container body 31 includes a front wall 40, a rear wall 41 opposed to the front wall 40 in the front-rear direction, a left wall 42 connecting the front wall 40 and the rear wall 41, a right wall 43 opposed to the left wall 42 in the left-right direction, an upper wall 44 connecting the front wall 40 and the rear wall 41, and a lower wall 45 opposed to the upper wall 44 in the up-down direction. The container body 31 has an upper surface 80 which is an outer surface of the upper wall 44. The outer surface of the front wall 40 faces frontward. The rear wall 41 has a rear surface 62 facing rearward. The left wall 42 has a left surface 42S facing leftward. The right wall 43 has a right surface 43S facing rightward. The outer surface of the upper wall 44, i.e., the upper surface 80 faces upward. The outer surface of the lower wall 45 faces downward.

As shown in FIG. 13, the front wall 40, the rear wall 41, the left wall 42, the right wall 43, the upper wall 44, and the lower wall 45 define a chamber 46 in the internal space of the container body 31. The front wall 40, the rear wall 41, the left wall 42, the right wall 43, the upper wall 44, and the lower wall 45 have translucency to the extent that the liquid level of the ink stored in the chamber 46 can be visually recognized from the outside. The container body 31 is, for example, an integrally molded product made of a synthetic resin. The front wall 40 has an upper front wall 40U positioned on the upper side and a lower front wall 40L positioned on the lower side. The upper front wall 40U is positioned frontward of the lower front wall 40L in the front-rear direction. A space behind the upper front wall 40U in the front-rear direction is also a part of the chamber 46. In other words, the upper portion of the chamber 46 extends further frontward than the lower portion of the chamber 46. The lower front wall 40L is continuous with the supply portion 33. The outer surface of the lower front wall 40L is an example of a front surface.

Figure 10:
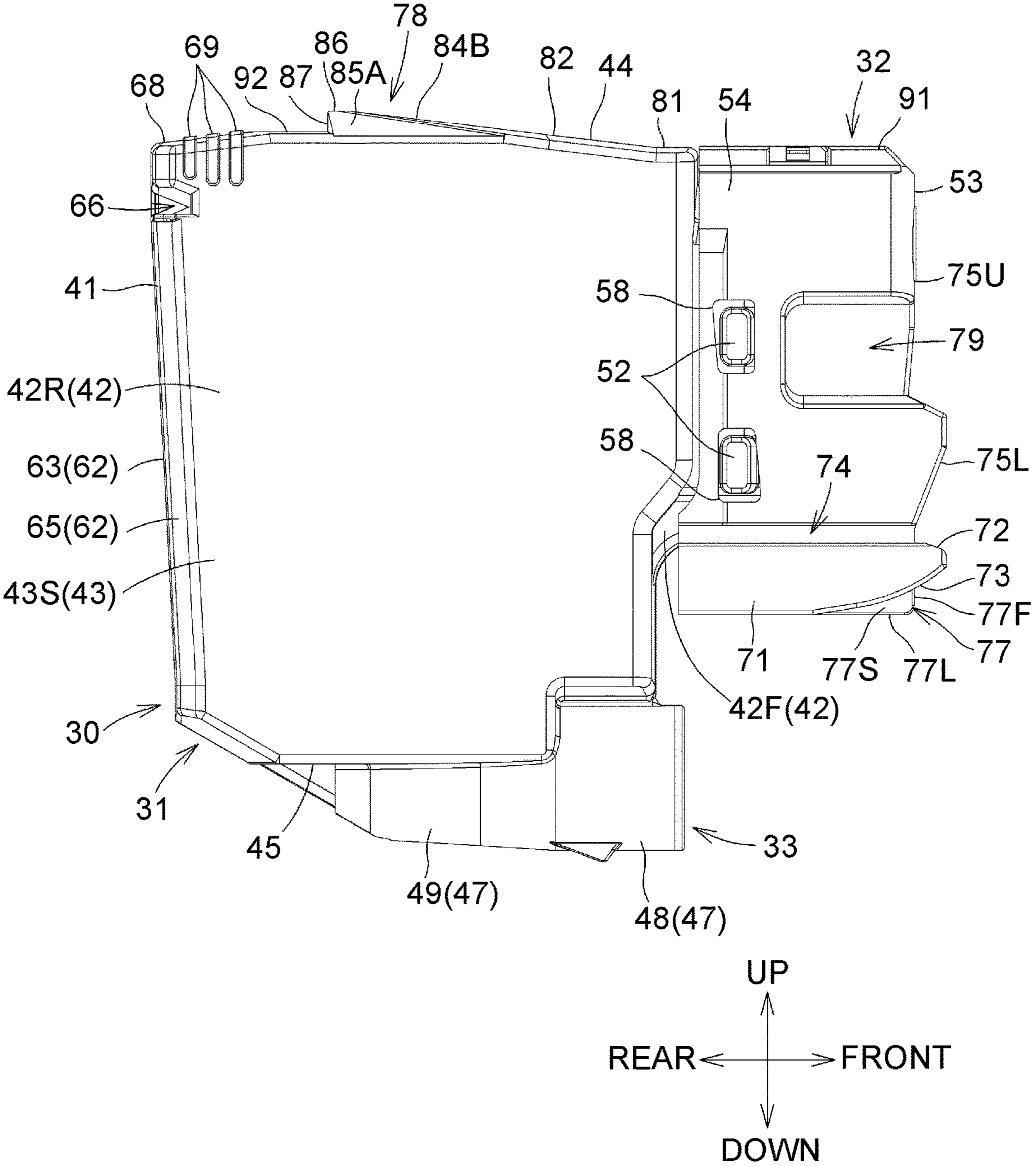
FIG. 10 is a left side view of the ink cartridge 30.

As shown in FIG. 10, the left wall 42 includes a front left wall 42F positioned on the front side in the front-rear direction and a rear left wall 42R positioned on the rear side in the front-rear direction.

Figure 5:
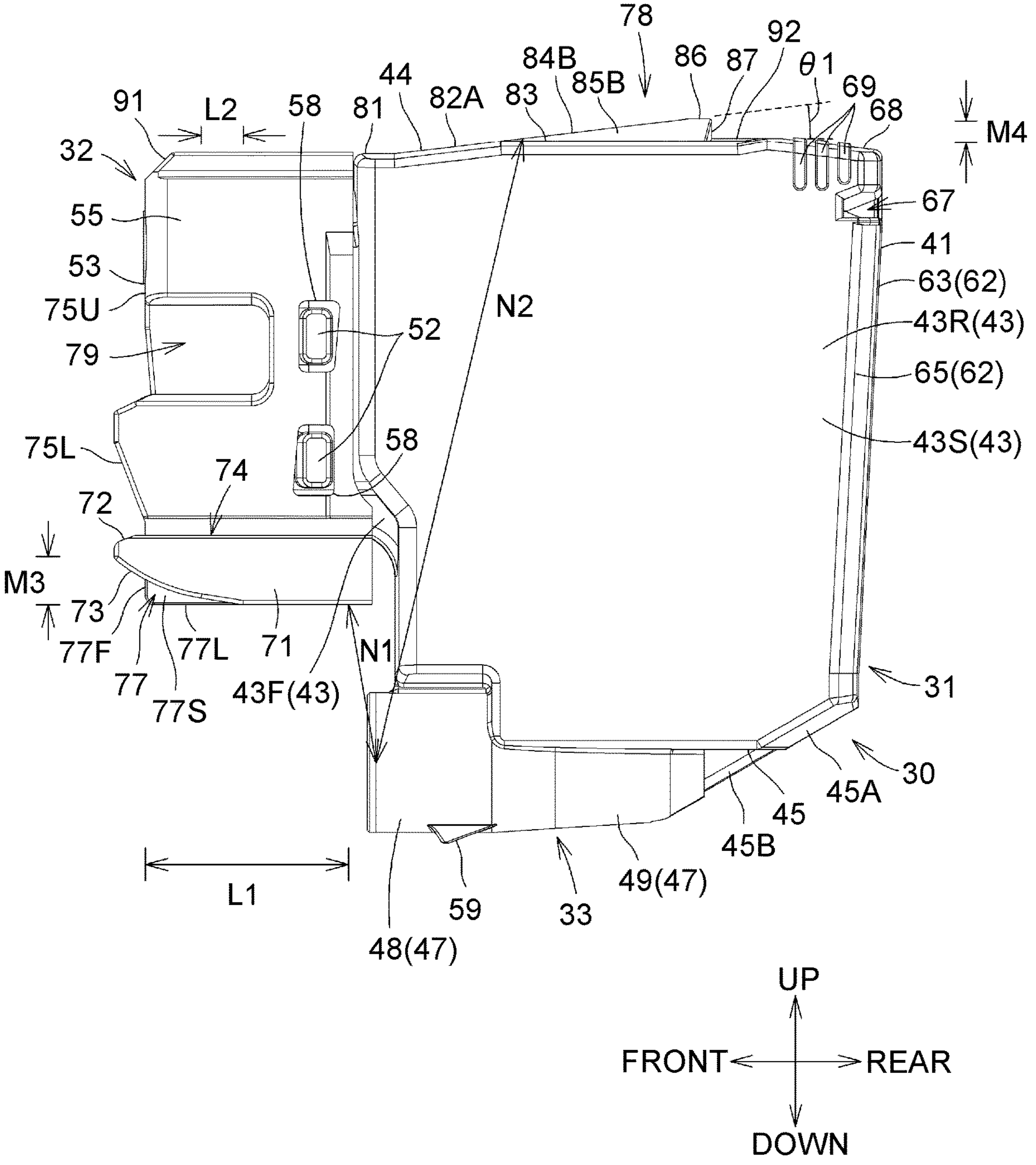
FIG. 5 is a right side view of the ink cartridge 30.

As shown in FIG. 5, the right wall 43 includes a front right wall 43F positioned on the front side in the front-rear direction and a rear right wall 43R positioned on the rear side in the front-rear direction. The front left wall 42F and the front right wall 43F are continuous with the upper front wall 40U. The rear left wall 42R and the rear right wall 43R are continuous with the rear wall 41. A space between the front left wall 42F and the front right wall 43F is a part of the chamber 46. A distance in the left-right direction between an outer surface of the front left wall 42F and an outer surface of the front right wall 43F is smaller than a distance in the left-right direction between an outer surface of the rear left wall 42R and an outer surface of the rear right wall 43R.

Two protrusions 52 are positioned on the front left wall 42F. Two protrusions 52 are positioned on the front right wall 43F. On the front left wall 42F, the two protrusions 52 are separated from each other in the up-down direction. On the front right wall 43F, the two protrusions 52 are separated from each other in the up-down direction. The protrusion 52 has a substantially rectangular shape in a side view. The protrusion 52 passes through a through hole 76 of the cover 32 described later.

Figure 3:
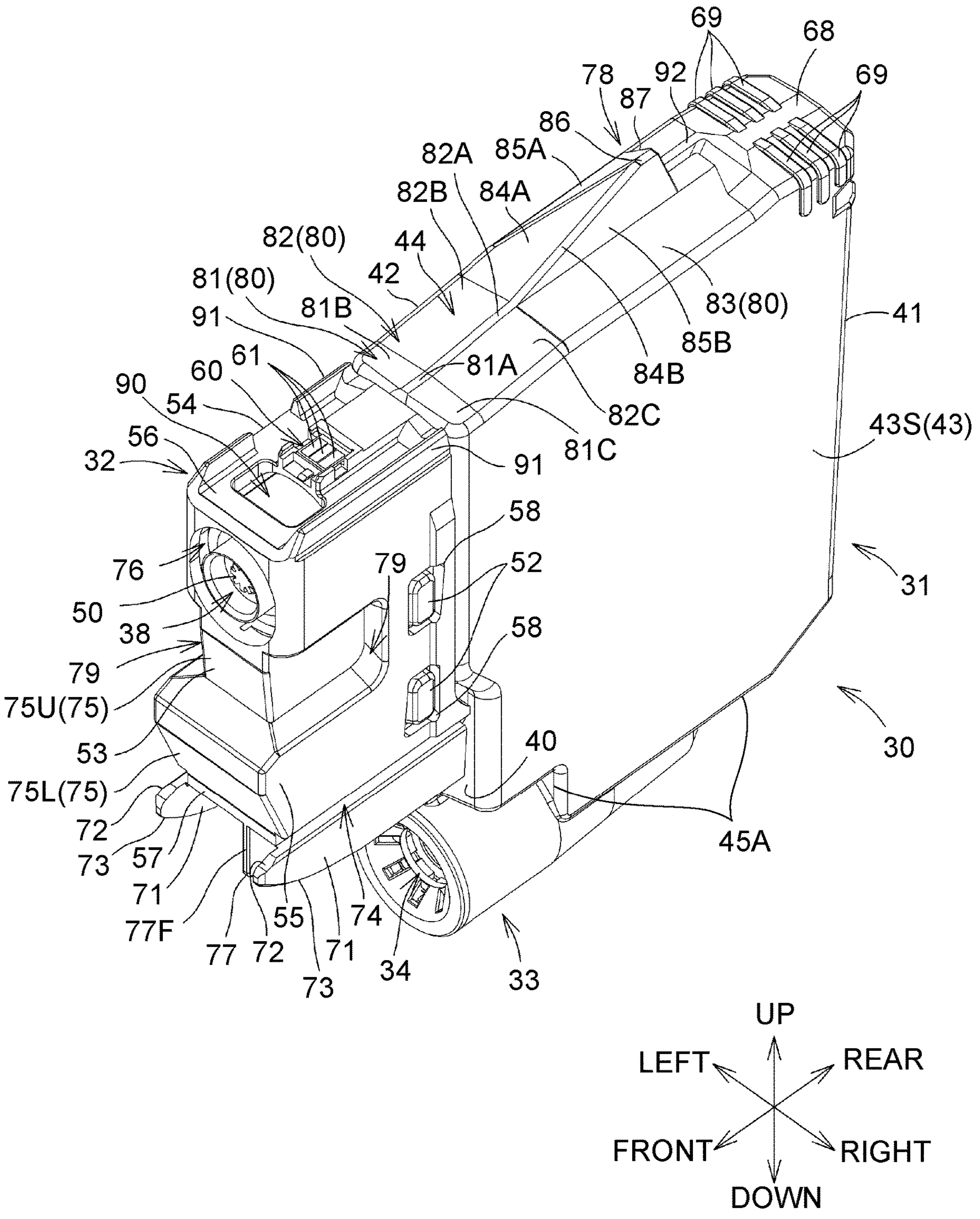
FIG. 3 is a perspective view of an ink cartridge 30 as viewed from the front and above.
Figure 4:
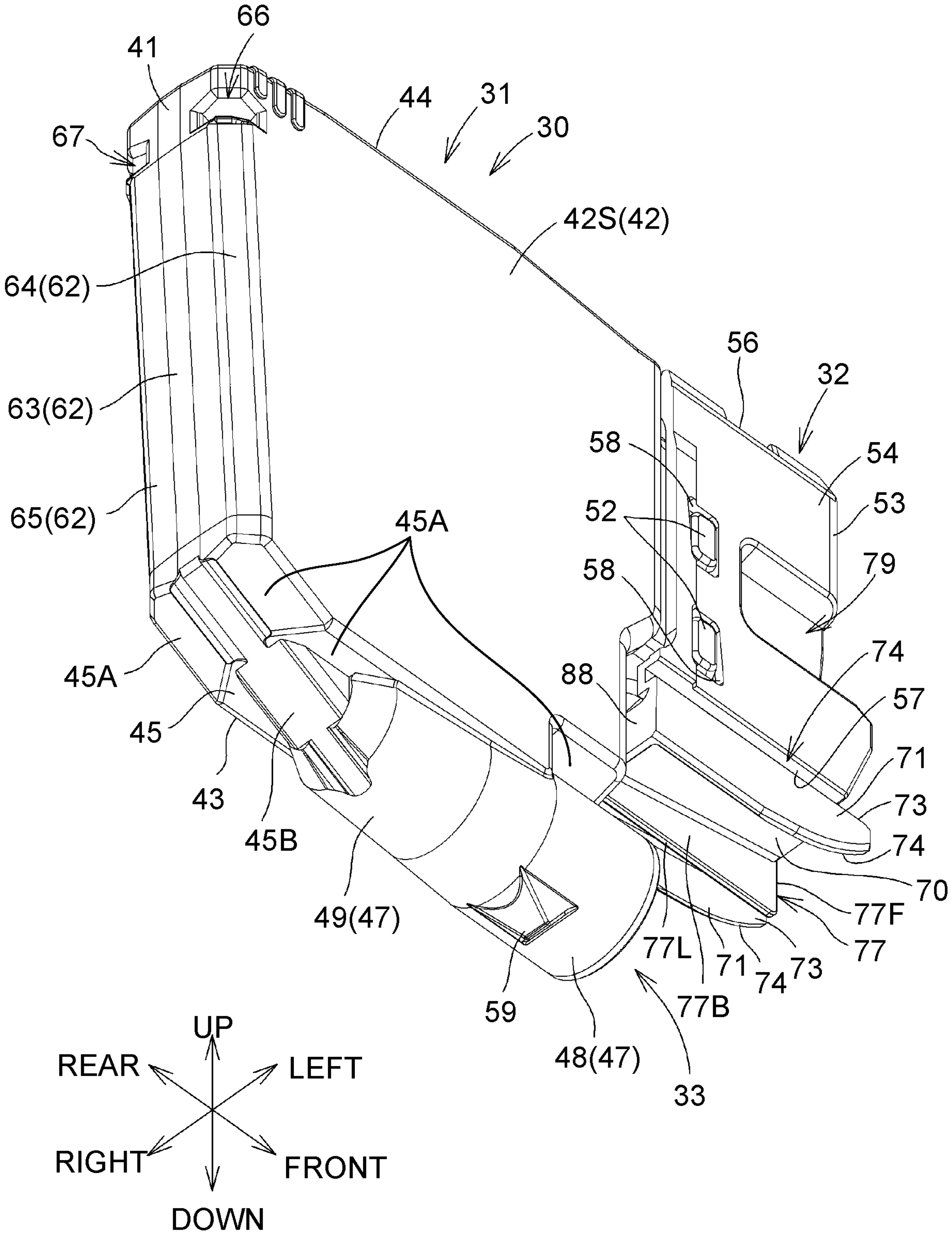
FIG. 4 is a perspective view of the ink cartridge 30 as viewed from the rear and below.

As shown in FIGS. 3 and 4, the supply portion 33 is a cylindrical member. The supply portion 33 has an outer peripheral surface extending in the front-rear direction. The outer peripheral surface is a curved surface curved in a circumferential direction with the front-rear direction as an axis, that is, around an axis of the supply port 34 parallel to the front-rear direction. The supply portion 33 is positioned at a lower end of the container body 31, and a part of an outer surface of the supply portion 33 constitutes a lower surface 47 of the container body 31.

The supply portion 33 has a supply port 34 through which the ink flows out of the ink cartridge 30. The supply port 34 is positioned at the front end of the supply portion 33. The supply port 34 is circular when viewed from the front. The lower surface 47 includes a lower half of a circumferential surface having an axis in the front-rear direction. The lower surface 47 includes a first surface 48 having a cylindrical shape in the front-rear direction and a second surface 49 positioned rearward of the first surface 48 in the front-rear direction. The outer diameter of the supply portion 33 decreases from the first surface 48 toward the second surface 49.

As shown in FIG. 13, the supply portion 33 has a cylindrical shape and has an internal space. The internal space of the supply portion 33 communicates with the chamber 46 at the rear in the front-rear direction. Ink in the internal space of the supply portion 33 can flow out to the outside of the ink cartridge 30 through the supply port 34. That is, the internal space of the supply portion 33 extends forward from the chamber 46. A seal member 35, a valve 36, and a coil spring 37 are positioned in the internal space of the supply portion 33.

The seal member 35 is an annular member made of an elastic member, for example, rubber or the like, and is positioned in the supply port 34 and in the internal space of the supply portion 33. The supply port 34 is filled with the seal member 35, but ink in the internal space of the supply portion 33 can flow out to the outside of the ink cartridge 30 through a hole formed through the center of the seal member 35 in the front-rear direction, that is, ink in the internal space of the supply portion 33 still can flow out to the outside of the ink cartridge 30 through the supply port 34.

When the valve 36 comes into contact with the seal member 35, the hole formed through the seal member 35 is closed or sealed, in other words, the supply port 34 is closed or sealed. That is, ink in the internal space of the supply portion 33 cannot flow out to the outside of the ink cartridge 30 through the hole formed through the seal member 35, in other words, cannot flow out to the outside of the ink cartridge 30 through the supply port 34. That is, the valve 36 opens and closes the supply port 34. The coil spring 37 biases the valve 36 toward the seal member 35 so that the valve 36 contacts the seal member 35. The coil spring 37 is an example of a biasing member.

When the ink cartridge 30 is inserted into the cartridge case 110, the supply tube 102 enters the supply port 34. The outer circumferential surface of the supply tube 102 comes into contact with the inner circumferential surface, which defines the hole of the seal member 35, in a liquid-tight manner while the supply tube 102 elastically deforms the sealing member 35. When the rear end of the supply tube 102 passes through the sealing member 35 and enters the internal space of the supply portion 33, the rear end of the supply tube 102 comes into contact with the valve 36. When the ink cartridge 30 is further inserted into the cartridge case 110, the ink tube 102 pushes the valve 36 to move in the rearward direction against the biasing force of the coil spring 37.

When the valve 36 moves rearward, the internal space of the supply portion 33 and the internal space of the supply tube 102 communicate with each other, and the ink in the chamber 46 flows into the internal space of the supply tube 102 through the internal space of the supply portion 33. Although not illustrated in the drawings, ink flows from the internal space of the supply portion 33 through a hole formed in the rear end of the supply tube 102 to the internal space of the supply tube 102. As such, ink in the internal space of the supply portion 33 flows out to the outside of the ink cartridge 30 through the supply tube 102 positioned in the supply port 34, in other words, through the supply port 34.

The seal member 35 is in contact with the outer circumferential surface of the supply tube 102 so as not to leak the ink. The valve 36, which closes or seal the supply port 34 and the coil spring 37, are not necessarily provided. For example, in another embodiment, the supply port 34 may be blocked with a film or the like, and when the ink cartridge 30 is inserted into the cartridge case 110, the supply tube 102 breaks the film and the rear end of the supply tube 102 thereby enters the internal space of the supply portion 33 through the supply port 34. Alternatively, in yet another embodiment, the hole of the seal member 35 positioned in the supply port 34 may be closed due to the elasticity of the seal member 35 itself, and when the supply tube 102 is inserted, the hole is expanded by being pressed by the supply tube 102 and the rear end of the supply tube 102 thereby enters the internal space of the supply portion 33 through the supply port 34. In any case, ink in the internal space of the supply portion 33 flows out to the outside of the ink cartridge 30 through the supply tube 102 positioned in the supply port 34, in other words, through the supply port 34.

As shown in FIG. 4, a convex portion 59 protruding downward is positioned on the first surface 48 of the supply portion 33.

Figure 7:
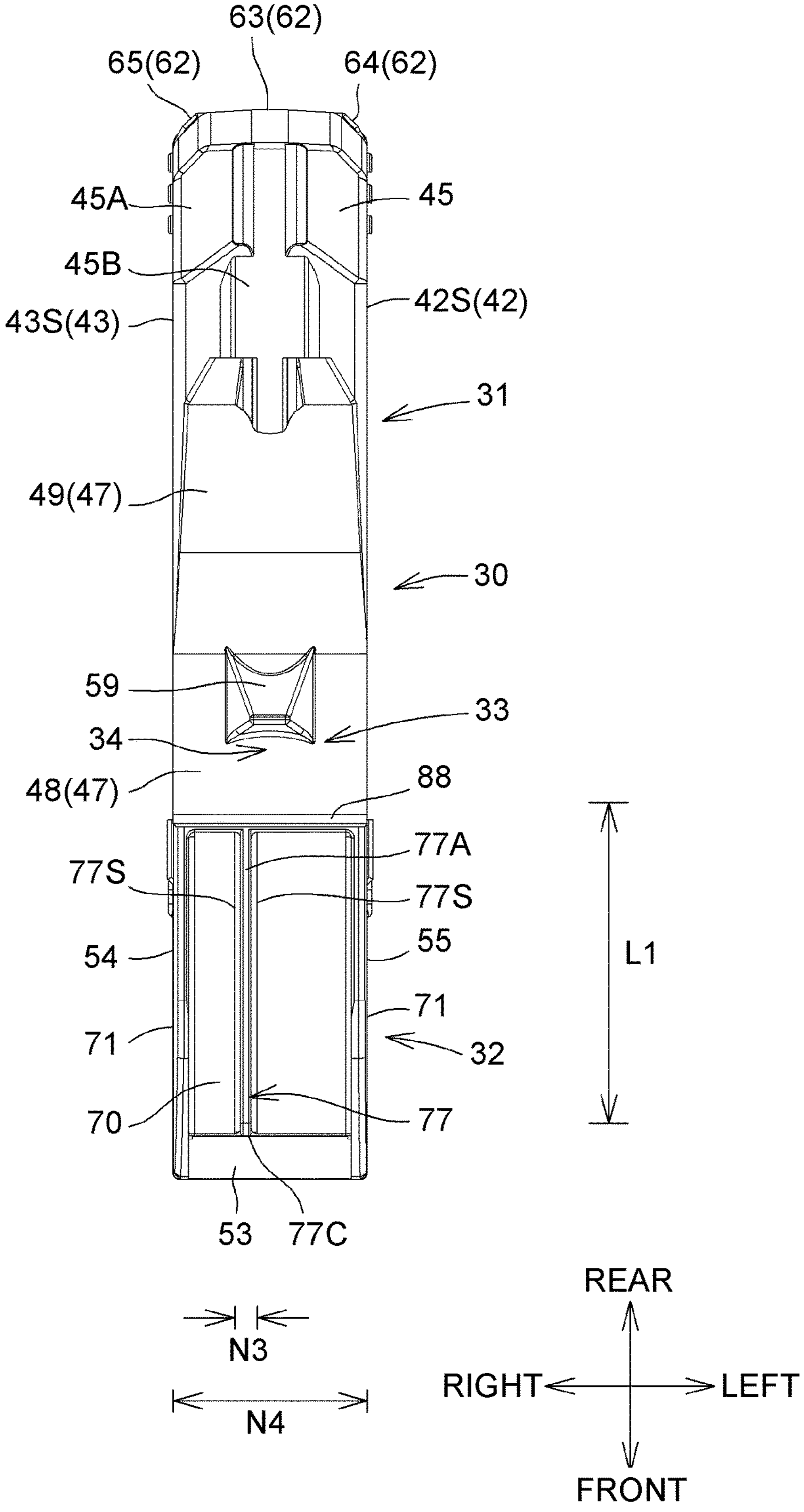
FIG. 7 is a bottom view of the ink cartridge 30.

As shown in FIG. 7, an outline of a portion where the convex portion 59 is continuous with the first surface 48 has a substantially square shape when viewed upward from below in the up-down direction, and a length of the outline in the front-rear direction is substantially equal to a length of the outline in the left-right direction. Both side surfaces of the convex portion 59 in the left-right direction are downward triangles. Each side surface of the convex portion 59 in the left-right direction is a tapered surface that is inclined toward the center of the convex portion 59 in the left-right direction as the side surface extends downward. In other words, the convex portion 59 has a tapered shape in which the length in the left-right direction gradually decreases as the side surface extends downward.

As shown in FIG. 13, an atmosphere opening passage 38 that connects the vicinity of the upper end of the chamber 46 and is connectable to the outside of the ink cartridge 30 is positioned at the upper front wall 40U of the container body 31. The atmosphere opening passage 38 opens frontward at the upper front wall 40U. A valve 50 and a coil spring 51 are positioned in the atmosphere opening passage 38. The coil spring 51 is an example of a biasing member. A front end of the coil spring 51 is positioned above and frontward of the supply port 34 of the supply portion 33. The front end of the coil spring 51 is positioned frontward of the second key portion 78. The valve 50 is movable in the front-rear direction in the atmosphere opening passage 38. The coil spring 51 biases the valve 50 frontward. The valve 50 urged by the coil spring 51 seals the opening of the atmosphere opening passage 38. As will be described in detail later, when the valve 50 moves rearward against the urging force of the coil spring 51, the atmosphere opening passage 38 is opened to allow air to flow between the outside of the ink cartridge 30 and the chamber 46.

The cover 32 has a substantially rectangular parallelepiped shape whose length in the left-right direction is smaller than a length in the up-down direction and a length in the front-rear direction of the container body 31. The cover 32 has a box shape having an opening facing rearward.

The cover 32 includes a front wall 53, a left wall 54 extending rearward from a left end of the front wall 53, a right wall 55 opposed to the left wall 54 in the left-right direction, an upper wall 56 extending rearward from an upper end of the front wall 53, and a lower wall 57 opposed to the upper wall 56 in the up-down direction. The front wall 53, the left wall 54, the right wall 55, the upper wall 56, and the lower wall 57 define an internal space of the cover 32.

The opening of the cover 32 is defined by rear ends of the front wall 53, the left wall 54, the right wall 55, the upper wall 56, and the lower wall 57. The front wall 53 is a part of the front wall of the ink cartridge 30. The left wall 54 is a part of a left wall of the ink cartridge 30. The right wall 55 is a part of the right wall of the ink cartridge 30. The upper wall 56 is a part of an upper wall of the ink cartridge 30. The lower wall 57 is a part of a lower wall of the ink cartridge 30. The length of the cover 32 in the up-down direction is smaller than the length of the container body 31 in the up-down direction. The length of the cover 32 in the front-rear direction is smaller than the length of the container body 31 in the front-rear direction. The distance of the cover 32 in the left-right direction is slightly greater than the distance between the outer surface of the front left wall 42F and the outer surface of the front right wall 43F of the container body 31 in the left-right direction, and is substantially the same as the distance between the outer surface of the rear left wall 42R and the outer surface of the rear right wall 43R in the left-right direction.

The left wall 54 has two through holes 58 spaced apart in the up-down direction. The right wall 55 has two through holes 58 spaced apart in the up-down direction. The protrusions 52 on the front left wall 42F are positioned in the through holes 58 of the left wall 54, and the protrusions 52 on the front right wall 43F are positioned in the through holes 58 of the right wall 55. The through hole 58 has a substantially rectangular shape. Specifically, the length of each through hole 58 in the up-down direction is greater than the length thereof in the front-rear direction. The through hole 58 is sufficiently larger than the outer shape of the protrusion 52. That is, the length of each through hole 58 in the up-down direction is greater than the length of each protrusion 52 in the up-down direction. The length of each through hole 58 in the front-rear direction is greater than the length of each protrusion 52 in the front-rear direction. The container body 31 and the cover 32 are assembled by inserting the protrusions 52 into the corresponding through holes 58.

Since the through hole 58 is larger than the outer shape of the protrusion 52, the cover 32 is relatively movable in the up-down direction and the front-rear direction with respect to the container body 31 in a state where the container body 31 and the cover 32 are assembled.

Since the through hole 58 is sufficiently larger than the outer shape of the protrusion 52, the cover 32 can move relative to the container body 31 not only in the up-down direction and the front-rear direction, but also in a direction in which the cover 32 rotates relative to the container body 31 along a plane extending in the up-down direction and the front-rear direction.

The cover 32 covers the upper front wall 40U of the container body 31 in the state in which the cover 32 is attached to the container body 31. The front wall 53 of the cover 32 is positioned frontward of the supply port 34. The supply port 34 is positioned below the lower wall 57 of the cover 32.

The IC board 60 is positioned on the upper wall 56 of the cover 32. The IC board 60 is an example of an electrical interface. The IC board 60 extends in the front-rear direction and the left-right direction. The IC board 60 is positioned above the supply port 34. The IC board 60 includes a substrate formed of, for example, silicone or glass epoxy, an IC mounted on the substrate and three electrodes 61 mounted on the substrate. Note that the IC does not appear in the drawings. Three electrodes 61 face upward. The IC board 60 may comprise a flexible substrate having flexibility. The IC board 60 is bonded to the upper wall 56 of the cover 32 by, for example, a photocurable resin. The IC board 60 may be bonded to the cover 32 by an adhesive other than the photocurable resin, or may be attached to the cover 32 by fitting or the like other than bonding.

The electrodes 61 of the IC board 60 come into contact with the contacts 125 in the process in which the ink cartridge 30 is inserted into the cartridge case 110. In the attached state where the ink cartridge 30 is attached to the cartridge case 110, the IC board 60 is in contact with and electrically connected to the contacts 125. The IC is a semiconductor integrated circuit. Information related to the ink cartridge 30 is readably stored in the IC. The information related to the ink cartridge 30 is, for example, data indicating information such as a lot number, a manufacturing date, and an ink color. The electrode 61 is electrically connected to the IC. The electrode 61 extends in the front-rear direction. The electrodes 61 are arranged on the upper surface of the IC board 60 so as to be spaced apart from each other in the left-right direction. The electrode 61 is exposed on the upper surface of the IC board 60 so as to be electrically accessible.

As shown in FIG. 3, the upper wall 56 of the cover 32 has a through hole 90 in front of the IC board 60. The atmosphere opening passage 38 is positioned below the through hole 90.

Guide pieces 91 extending in the front-rear direction protrude upward near both ends of the upper wall 56 of the cover 32 in the left-right direction. The IC board 60 is positioned between the one guide piece 91 and the other guide piece 91 in the left-right direction. The guide piece 91 functions as a guide for the cover 32 to move along the front-rear direction when the cover 32 is inserted into the cartridge case 110.

As shown in FIG. 7, a lower surface 70 which is an outer surface of the lower wall 57 of the cover 32 is positioned above and frontward of the supply port 34. The lower surface 70 is a flat surface extending rearward from the lower end of the front wall 53 and is inclined so as to extend downward toward the rear.

The cover 32 has walls 71 extending downward from both ends of the lower surface 70 in the left-right direction. The one wall 71 and the other wall 71 are spaced apart from each other in the left-right direction. The one wall 71 and the other wall 71 are examples of a first wall and a second wall. The wall 71 is a plate-like member extending in the up-down direction and the front-rear direction and having a thickness in the left-right direction. The length of the wall 71 in the front-rear direction is greater than the length of the wall 71 in the left-right direction and the length of the wall 71 in the up-down direction. The length of the wall 71 in the up-down direction is greater than the length thereof in the left-right direction.

As shown in FIG. 5, the front surface of the wall 71 has a first front surface 72 positioned at an upper portion thereof and a second front surface 73 positioned at a lower portion thereof. A front end of the first front surface 72 is inclined so as to extend upward as the front end of the first front surface 72 extends toward the rear. The second front surface 73 is inclined so as to extend downward as the front end of the second front surface 73 extends toward the rear.

As shown in FIG. 7, the rear ends of the two walls 71 contact with a sub-front wall 88 (also referred to as a wall), and the two walls 71 extend frontward from the sub-front wall 88. The sub-front wall 88 extends downward from the rear end of the lower surface 70. The sub-front wall 88 has a plate shape extending in the up-down direction and the left-right direction and having a thickness in the front-rear direction. The length of the sub-front wall 88 in the left-right direction is greater than the length thereof in the up-down direction. The outer surface of the sub-front wall 88 facing frontward is a part of the front surface of the cover 32.

In the left wall 54 of the cover 32, a groove 74 (also referred to as a first groove 74) extending in the front-rear direction is positioned above the wall 71. The first groove 74 is positioned leftward and upward of the first key portion 77 and extends in the front-rear direction. In the right wall 55 of the cover 32, a groove 74 (also referred to as a second groove 74) extending in the front-rear direction is positioned above the wall 71. The second groove 74 is positioned rightward and upward of the first key portion 77 and extends in the front-rear direction. A longitudinal direction of the groove 74 is the front-rear direction.

Figure 8:
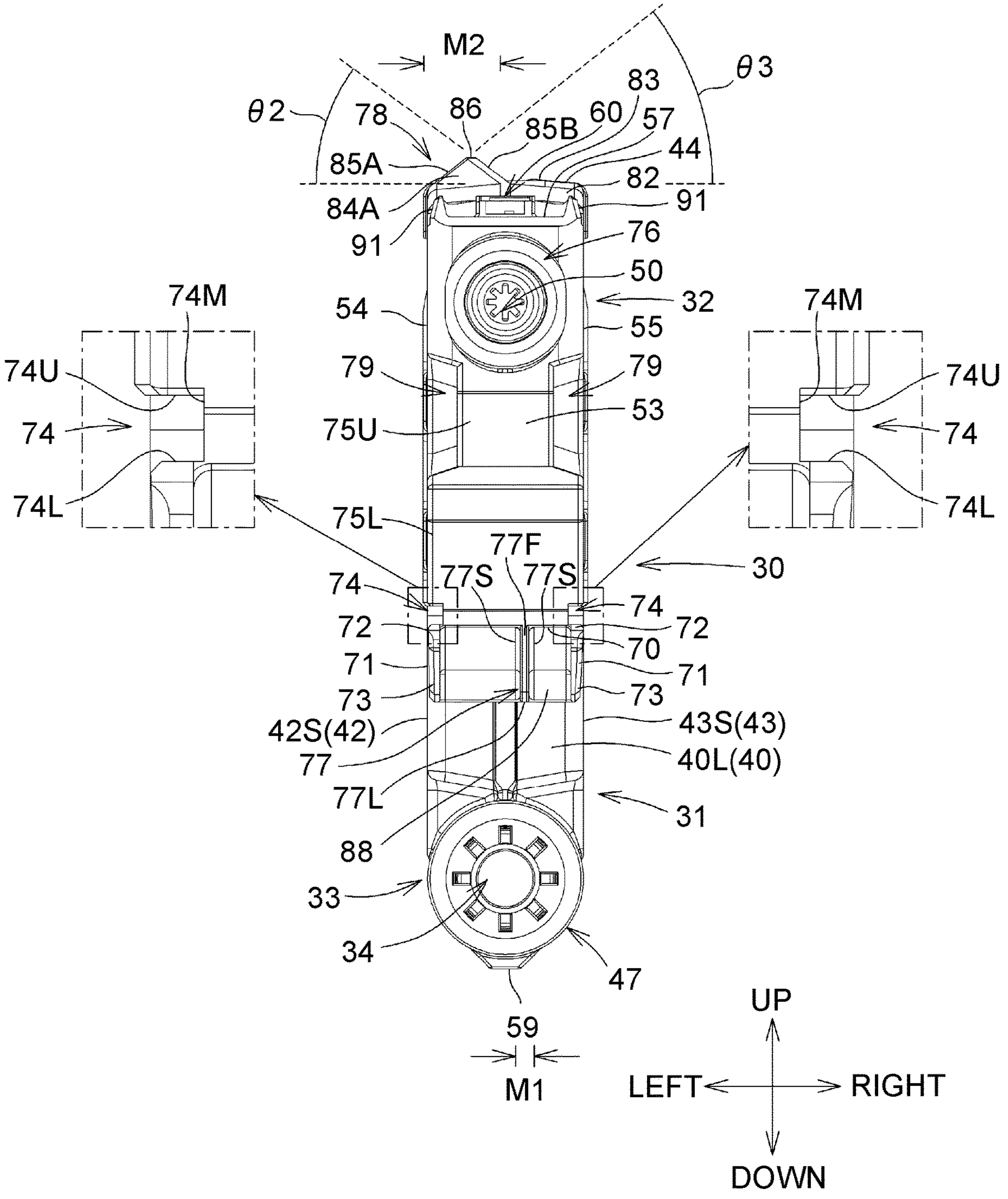
FIG. 8 is a front view of the ink cartridge 30.

As shown in FIG. 8, the groove 74 is defined by a surface 74L facing upward, a surface 74U facing the surface 74L in the up-down direction, and a surface 74M connecting the surface 74L and the surface 74U. The front end of the groove 74 is open frontward in the front wall 53 of the cover 32. That is, the first groove 74 has an opening at a front end and a left end, and the second groove has an opening at a front end and a right end.

As shown in FIGS. 3 to 10, the first front surface 72 of the one wall 71 serves as a guide for guiding the rib 118 of the cartridge case 110 into the one groove 74. The first front surface 72 of the other wall 71 serves as a guide for guiding the rib 119 of the cartridge case 110 into the first groove 74. One of the grooves 74 has a length capable of receiving the rib 118 of the case body 101 in the front-rear direction, and the other groove 74 has a length capable of receiving the rib 119 of the case body 101 in the front-rear direction. Specifically, the distance between the surface 74L and the surface 74U of the groove 74 in the up-down direction is greater than each of the lengths of the rib 118 and the rib 119 of the case body 101 in the up-down direction. The position of the cover 32 with respect to the case body 101 in the up-down direction is determined by the contact of the surface 74U and the surface 74L of one of the grooves 74 with the rib 118 and by the contact of the surface 74U and the surface 74L of one of the grooves 74 with the rib 119. The groove 74 is located above a lower surface 77L of the first key portion 77 described later. The groove 74 is an example of a guide groove.

The outer surface of the front wall 53 of the cover 32 is a front surface 75. The front surface 75 is positioned frontward of the supply port 34. The front surface 75 has an upper front surface 75U positioned at an upper portion thereof and a lower front surface 75L positioned at a lower portion thereof. The upper end of the lower front surface 75L is continuous with the upper front surface 75U. The lower end of the lower front surface 75L is positioned rearward of the upper end of the lower front surface 75L, and the lower front surface 75L is inclined upward as the lower front surface 75L extends toward the front. The lower front surface 75L is a guide for guiding the rib 118 and the rib 119 into the groove 74. Specifically, in the process in which the ink cartridge 30 is inserted into the case 110, the lower front surface 75L comes into contact with the front end of the rib 118 and the front end of the rib 119. In this configuration, the lower front surface 75L guides each of the rib 118 and the rib 119 to the groove 74. The upper front surface 75U of the front wall 53 of the cover 32 has a through hole 76.

The valve 50 of the container body 31 is exposed to the outside through the through hole 76. The front end of the through hole 76 is positioned frontward of the supply port 34 of the supply portion 33.

The lower surface 70 of the cover 32 has a first key portion 77. The first key portion 77 is positioned above the supply port 34 and below the upper surface of the electrode 61 of the IC board 60. The front end of the first key portion 77 is positioned frontward of the front end of the electrode 61. The first key portion 77 is positioned below the through hole 76. In other words, the opening of the atmosphere opening passage 38 is positioned between the first key portion 77 and the electrode 61 in the up-down direction. The first key portion 77 is positioned at a front part of the ink cartridge 30. The first key portion 77 is an example of a guide wall.

As shown in FIG. 8, the first key portion 77 is positioned between the pair of walls 71 in the left-right direction and extends downward from the lower surface 70. A rear end of the wall 71 is continuous with the sub-front wall 88. A rear end of the first key portion 77 is continuous with the sub-front wall 88. That is, the first key portion 77 extends forward from the sub-front wall 88. The first key portion 77 has a lower surface 77L defining a lower end of the first key portion 77, side surfaces 77S, and a front surface 77F defining a front end of the first key portion 77. The side surfaces 77S of the first key portion 77 include a surface facing leftward and a surface facing rightward. Each of the side surfaces 77S of the first key portion 77 extends along the up-down direction and the front-rear direction. The lower surface 77L is an example of a lower end. The side surface 77S is an example of a left guide surface and a right guide surface. The lower surface 77L of the first key portion 77 extends along the front-rear direction and left-right direction. The lower surface 77L defines the width of the first key portion 77 in the left-right direction.

In the present embodiment, the first key portion 77 has a plate shape in which the length (second length) in the front-rear direction is greater than the length (first length) in each of the left-right direction and the length in the up-down direction, however the shape of the first key portion 77 is not limited thereto. For example, the length of the first key portion 77 in the front-rear direction may be smaller than the length thereof in the up-down direction.

The lower surface 77L is a position overlapping at least one of the electrodes 61 in the up-down direction. That is, the first key portion 77 and at least a part of the electrodes 61 overlap in the up-down direction. In other words, the lower surface 77L is positioned directly below at least one of the electrodes 61 in the up-down direction. The lower surface 77L is located above the supply port 34 and below the electrodes 61.

As shown in FIG. 5, the length L1 of the lower surfaces 77L in the front-rear direction is greater than the length L2 of the upper surface of the electrodes 61 in the front-rear direction. The front surface 77F of the first key portion 77 faces frontward. The front surface 77F is positioned rearward of the front end of the first front surface 72 of the wall 71. The first front surface 72 is positioned rearward of the front end of the second front surface 73. The front surface 77F of the first key portion 77 is located forward of the supply port 34 and rearward of the front end of the front wall 53 of the cover 32.

Thus, in a case where the ink cartridge 30 is dropped with the front wall 53 of the cover 32 facing downward, even when the first front surface 72 or the second front surface 73 of the wall 71 or the front end of the front wall 53 of the cover 32 collides with a floor or the like, the front surface 77F of the first key portion 77 does not collide with the floor or the like. Therefore, the first key portion 77 is less likely to be deformed by a direct impact. On a related note, as will be described later, the firs key portion 77 functions as a key to ensure that the ink cartridge 30 is attached to the right slot 108. When the first key portion 77 is deformed, the first key portion 77 may not correctly function as a key. The front surface 77F of the first key portion 77 is an example of a front end of a guide wall.

As shown in FIG. 7, the side surface 77S of the first key portion 77 facing leftward is positioned rightward of the left surface 42S of the container body 31. The side surface 77S of the first key portion 77 facing rightward is positioned leftward of the right surface 43S of the container body 31. Further, the side surface 77S of the first key portion 77 facing leftward is positioned rightward of the left end of the supply portion 33. The side surface 77S of the first key portion 77 facing rightward is positioned leftward of the right end of the supply portion 33. A distance N3 in the right-left direction between the two side surfaces 77S is smaller than a distance N4 in the right-left direction between the left surface 42S and the right surface 43S.

Figure 11:
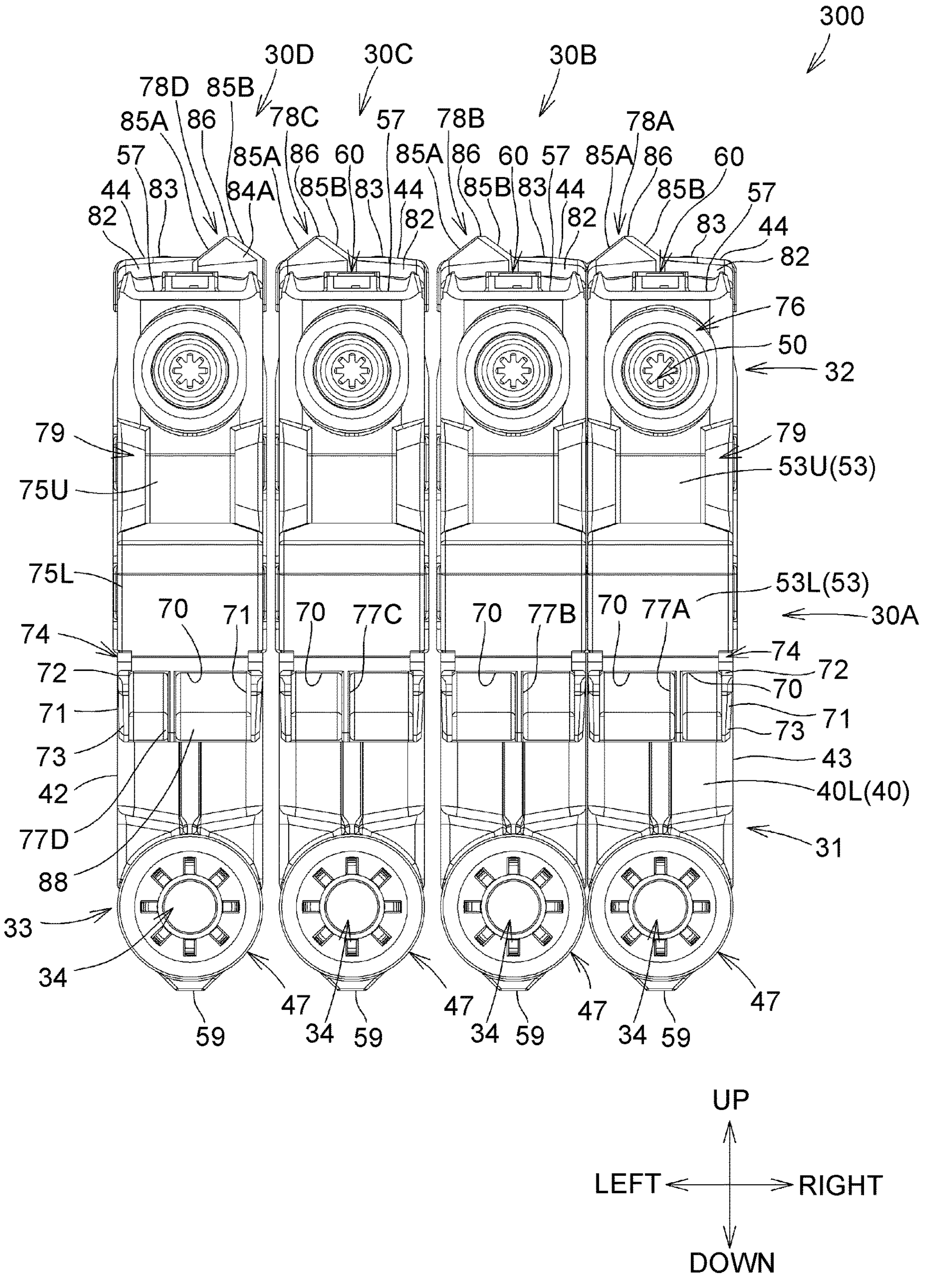
FIG. 11 is a front view of four ink cartridges 30.

As shown in FIG. 11, the position of the first key portion 77 (77A, 77B, 77C, and 77D) in the left-right direction is different among the four ink cartridges 30 (30A, 30B, 30C, and 30D). This difference in the position of the first key portions 77 (77A, 77B, 77C, and 77D) corresponds to the difference in the position of the first key slots 115 (115A, 115B, 115C, and 115D) in the slots 108 (108A, 108B, 108C, and 108D). This difference in the positions of the first key portions 77 (77A, 77B, 77C, and 77D) also corresponds to the difference of the characteristic of the ink cartridges 30 (30A, 30B, 30C, and 30D) (referred to as a first characteristic).

In this embodiment, the position of the first key portion 77 (77A, 77B, 77C, and 77D) in the left-right direction is different among the four ink cartridges 30 (30A, 30B, 30C, and 30D). Nevertheless, in another embodiment, the position of the first key portion 77 (77A, 77B, 77C, and 77D) in the left-right direction may be the same among the four ink cartridges 30 (30A, 30B, 30C, and 30D), but the shape of the first key portion 77 (77A, 77B, 77C, and 77D) may be different among the four ink cartridges 30 (30A, 30B, 30C, and 30D). In such a case, the position of the first key slots 115 (115A, 115B, 115C, and 115D) in the slots 108 (108A, 108B, 108C, and 108D) may be the same, but the shape of the first key slots 115 (115A, 115B, 115C, and 115D) in the slots 108 (108A, 108B, 108C, and 108D) may be different corresponding to the difference in shape of the first key portions 77 (77A, 77B, 77C, and 77D). As such, the mechanical characteristic, e.g., position or shape, of the first key portion 77 (77A, 77B, 77C, and 77D) is different among the four ink cartridges 30 (30A, 30B, 30C, and 30D). That is, the mechanical characteristic of the first key portion 77 (77A, 77B, 77C, and 77D) corresponds to the corresponding one of the ink cartridges 30 (30A, 30B, 30C, and 30D). That is, the first key portion 77 has a shape and/or position at the container body 31 which is associated with a corresponding first characteristic of the ink cartridge 30.

One example of the characteristic of the ink cartridge 30 is the characteristic of the ink stored in the chamber 46. In this embodiment, the position of the first key portion 77 in the left-right direction is different among the four ink cartridges 30 (30A, 30B, 30C, and 30D) depending on the characteristic of the ink stored in the chamber 46 The characteristic of the ink is, for example, the color or composition of the ink.

The cover 32 includes a third key portion 79. The third key portion 79 is defined by a recessed portion recessed from the left wall 54 of the cover 32, a recessed portion recessed from the right wall 55, a convex portion protruding leftward from the left wall 54, or a convex portion protruding rightward from the right wall 55. In the present embodiment, the third key portion 79 includes a recessed portion that is recessed from the left wall 54 of the cover 32 and a recessed portion that is recessed from the right wall 55.

As shown in FIG. 8, the third key portion 79 is a combination of the recessed portion of the left wall 54 and the recessed portion of the right wall 55.

The third key portion 79 is positioned above the first key portion 77 and below the upper surface of the electrode 61 of the IC board 60. In this embodiment, the third key portion 79 is positioned below the through hole 76. The third key portion 79 is positioned at both ends of the upper front surface 75U in the left-right direction. The front end of the third key portion 79 is opened frontward in the upper front surface 75U of the cover 32. That is, both of the recessed portion of the left wall 54 and the recessed portion of the right wall 55 are opened frontward in the upper front surface 75U of the cover 32. Depending on the characteristic of each ink cartridge 30, the mechanical characteristic such as the position and/or shape of the third key portion 79 is different. The characteristic of the ink cartridge 30 indicated by the third key portion 79 may be the same as or different from the characteristic of the ink cartridge 30 indicated by the first key portion 77.

In the present embodiment, the characteristic of the ink cartridge 30 indicated by the first key portion 77 is the color of the ink, and the characteristic of the ink cartridge 30 indicated by the third key portion 79 is the type of contract that a user will enter into when using a printer in which the ink cartridge 30 is used. The type of contract may include a contract in which a user is charged in accordance with the number of pages on which image recording is performed regardless of the amount of ink used. As long as this contract is concluded, a new ink cartridge 30 is delivered when the ink in the chamber 46 of the ink cartridge 30 is consumed, but the user does not have to pay for the ink cartridge 30 itself. Alternatively, the characteristic of the ink cartridge 30 indicated by the third key portion 79 is a sales area of the printer in which the ink cartridge 30 is used.

The shape of the third key portion 79 of the ink cartridge 30 used in a certain sales area is different from the shape of the third key portion 79 of the ink cartridge 30 used in another sales area. For example, the third key portion 79 may be disposed only on one of the left and right sides, or the shape of the third key portion 79 opening frontward may be different depending on the contract type or the sales area.

On a related note, as will be described later, in the present embodiment, the third key portions 79 including the recessed portion on the left wall 54 of the cover 32 and the recessed portion on the right wall 55 matches with the fitting piece 123 and the fitting piece 122, respectively. In a case where the third key portion is different in position or shape, the presence or absence and the shape of each of the fitting piece 123 and the fitting piece 122 may change depending on the presence or absence and the shape of the corresponding third key portion 79.

Figure 9:
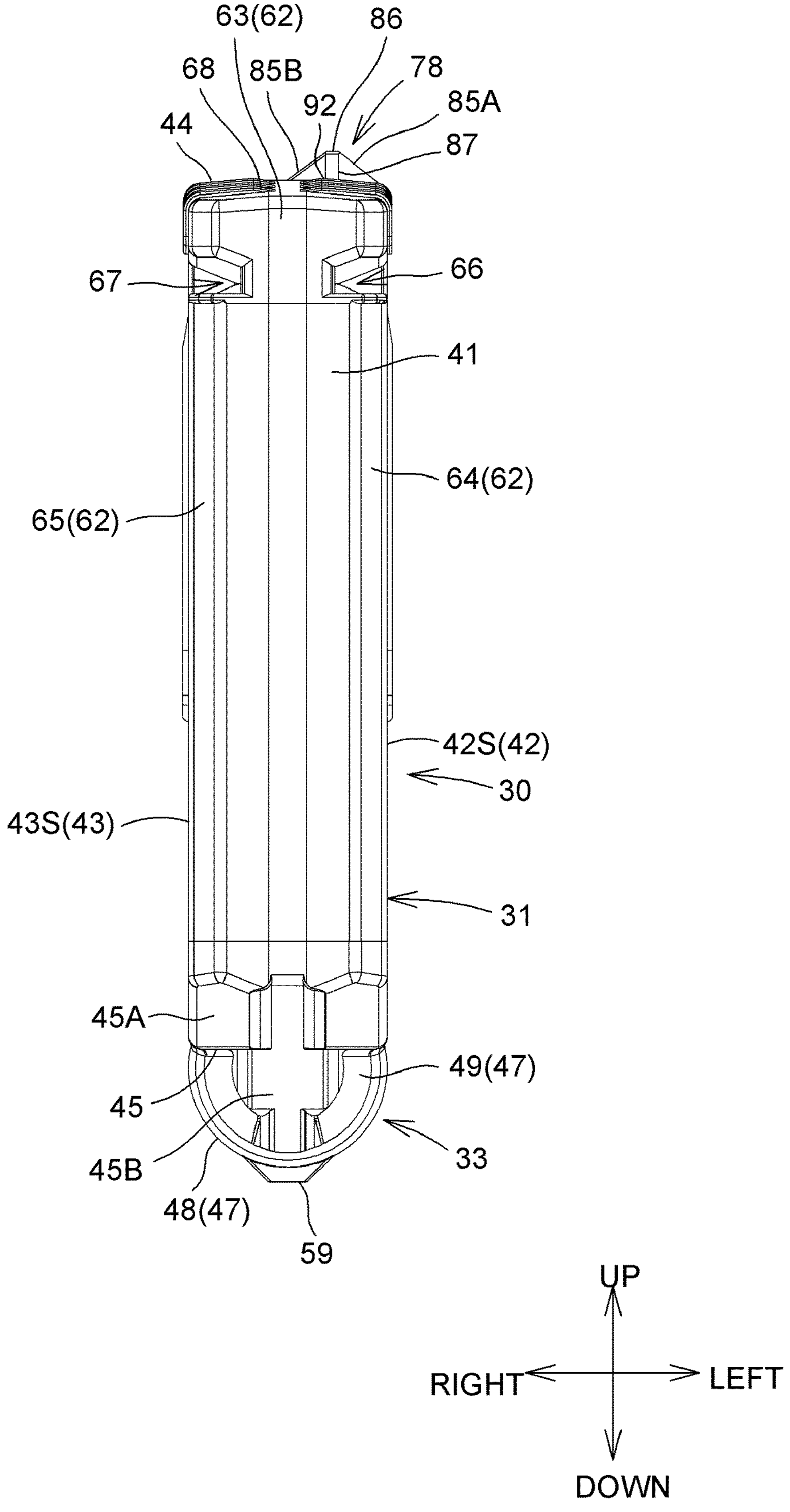
FIG. 9 is a rear view of the ink cartridge 30.

As shown in FIG. 9, the container body 31 has a rear surface 62 as an outer surface of the rear wall 41 of the container body 31. The rear surface 62 includes a first rear surface 63, a second rear surface 64, and a third rear surface 65. The second rear surface 64 is positioned on the left of the first rear surface 63. The third rear surface 65 is positioned on the right of the first rear surface 63. The first rear surface 63 is a flat surface orthogonal to the front-rear direction. The second rear surface 64 is a plane intersecting with the front-rear direction and the right-left direction. The right end of the second rear surface 64 is continuous with the first rear surface 63. The left end of the second rear surface 64 is positioned leftward and rearward of the first rear surface 63. The third rear surface 65 is a plane intersecting with the front-rear direction and the left-right direction. The left end of the third rear surface 65 is continuous with the first rear surface 63. The right end of the third rear surface 65 is positioned rightward and rearward of the first rear surface 63. The length of the first rear surface 63 in the left-right direction is constant in the up-down direction.

As shown in FIGS. 4, 5 and 9, the lower wall 45 of the container body 31 includes a first lower wall 45A and a second lower wall 45B. A rear end of the first lower wall 45A is continuous with a lower end of the rear wall 41. A front portion of the first lower wall 45A extends in the front-rear direction. A front end of the first lower wall 45A is continuous with the front wall 40.

The supply portion 33 is positioned on the first lower wall 45A. The curved front surface of the supply portion 33 including the rear end of the supply portion 33 protrudes downward from the first lower wall 45A. The second lower wall 45B is continuous with the lower end of the rear wall 41. The second lower wall 45B is an inclined wall inclined with respect to the front-rear direction. The second lower wall 45B is inclined with respect to the front-rear direction and the up-down direction such that an upper end of the second lower wall 45B is positioned rearward and upward of a lower end thereof. The lower end of the second lower wall 45B is continuous with the rear end of the lower surface 47 of the supply portion 33. The lower end of the second lower wall 45B is continuous with the rear end of the supply portion 33 in a position below the first lower wall 45A. The second lower wall 45B is shorter than the first lower wall 45A in the left-right direction.

Since the supply portion 33 is positioned below the first lower wall 45A, as shown in FIG. 9, the lower surface 47 of the supply portion 33 is visible when the ink cartridge 30 is viewed from the rear. Therefore, it is possible for the user to recognize where the supply portion 33 is when viewed from the rear, and it is easy to attach the ink cartridge 30 in the correct orientation when the ink cartridge 30 is attached to the slot 108.

In addition, since the lower wall 45 is continuous with the rear end of the supply portion 33, the rear end of the supply portion 33 is reinforced. As a result, even if the lower end of the ink cartridge 30 receives an impact, the supply portion 33 is less likely to be deformed. Note that the lower wall 45 may have only the first lower wall 45A without the second lower wall 45B.

The second rear surface 64 has a recess 66 near the upper end. The recess 66 is constituted by a space recessed frontward from the second rear surface 64 and a surface defining the space. The third rear surface 65 has a recess 67 near the upper end. The recess 67 is constituted by a space recessed frontward from the third rear surface 65 and a surface defining the space.

As shown in FIG. 1, a protrusion 127 protruding from the cover 126 is accommodated in each of the recesses 66 and 67 when the cover 126 is closed. The protrusion 127 of the cover 126 in the closed state is in contact with the surface forming the upper end of the recesses 66 and 67. With this configuration, the ink cartridge 30 attached to the cartridge case 110 is less likely to be detached from the cartridge case 110 due to an impact or the like.

Further, as shown in FIG. 9, a length in the left-right direction of the first rear surface 63 sandwiched between the recess 66 and the recess 67 is greater than a length in the left-right direction of the recess 66 and greater than a length in the left-right direction of the recess 67. Thus, since the first rear surface 63 is easily visible from the rear of the ink cartridge 30, the user is more likely to press an upper portion of the first rear surface 63 when attaching the ink cartridge 30 to the cartridge case 110.

As shown in FIGS. 9 and 10, the rear end of the upper surface 80 of the upper wall 44 of the container body 31 includes an operation surface 68. The operation surface 68 is an inclined surface inclined so as to face upward and rearward. The operation surface 68 is continuous with the upper end of the rear surface 62. The operation surface 68 has a plurality of protrusions 69 that protrude upward and extend along the left-right direction.

As shown in FIG. 12, the protrusions 69 extend downward from both ends of the operation surface 68 in the left-right direction so as to reach the outer surfaces of the left wall 42 and the right wall 43. Three protrusions 69 extend from the left end of the operation surface 68 to the left wall 42 so as to be spaced apart in the front-rear direction. Three protrusions 69 extend from the right end of the operation surface 68 to the right wall 43 so as to be spaced apart in the front-rear direction. The protrusions 69 function as a slip stopper when the user operates the operation surface 68. Note that the slip stopper may be, for example, a recess recessed downward from the operation surface 68 instead of the protrusion 69.

The upper surface 80 of the container body 31 includes a first upper surface 81, a second upper surface 82, a third upper surface 83, an upper end surface 86, and the operation surface 68. The first upper surface 81 is positioned at a front end of the upper surface 80.

Figure 6:
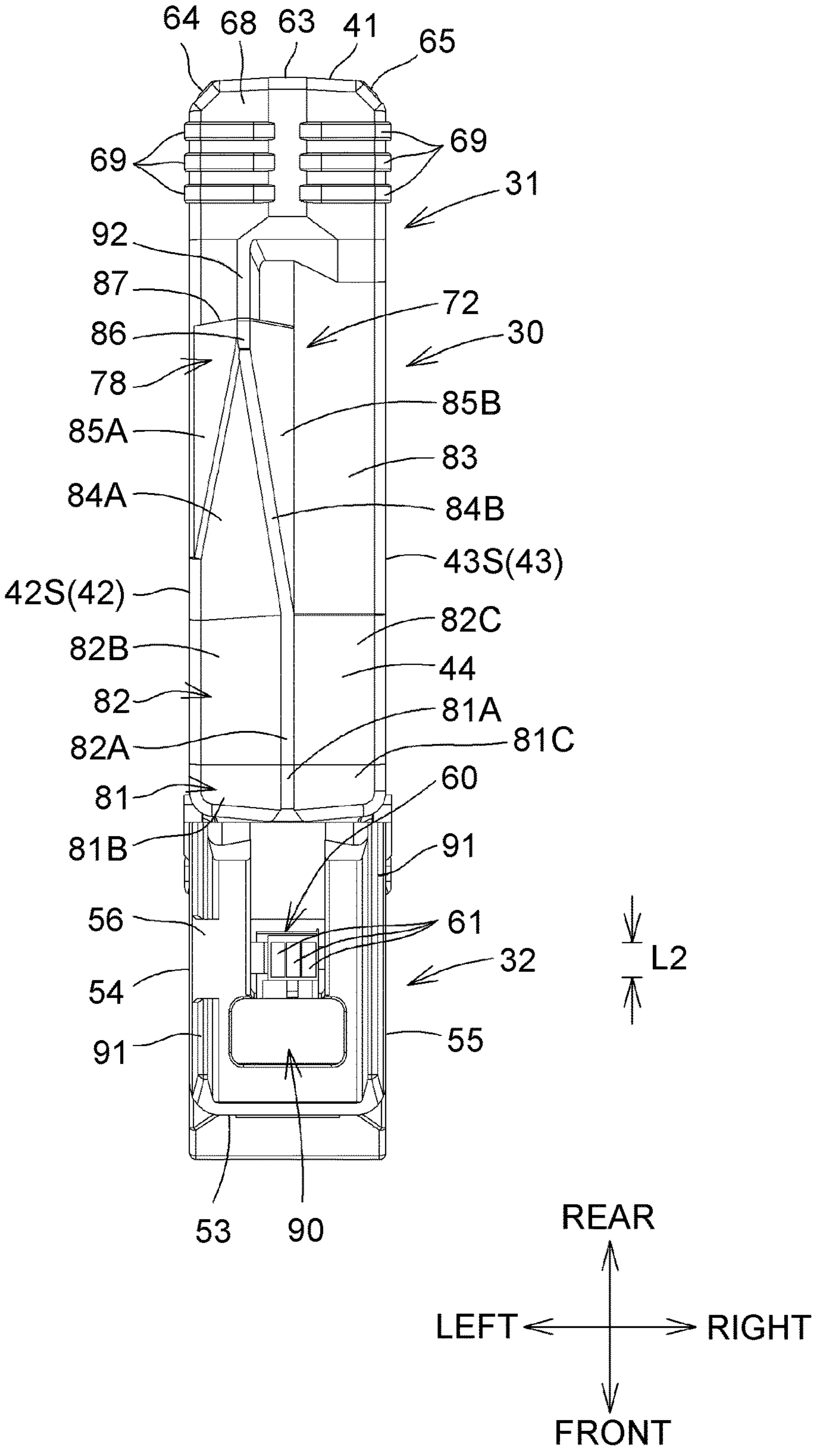
FIG. 6 is a plan view of the ink cartridge 30.

As shown in FIGS. 3 and 6, the first upper surface 81 has a surface 81A positioned at the center in the left-right direction, a surface 81B positioned on the left, and a surface 81C positioned on the right. The surface 81A is a plane orthogonal to the up-down direction. The surface 81B is continuous with the left end of the surface 81A. The surface 81C is continuous with the right end of the surface 81A. The surface 81B is a surface facing upward and leftward. The surface 81C is a surface facing upward and rightward. The length of the surface 81A in the left-right direction is smaller than the length of the surface 81B in the left-right direction. The length of the surface 81A in the left-right direction is smaller than the length of the surface 81C in the left-right direction.

The second upper surface 82 is continuous with the rear end of the first upper surface 81. The rear end of the second upper surface 82 is positioned higher than the front end thereof. The second upper surface 82 has a surface 82A positioned at the center in the left-right direction, a surface 82B positioned on the left of the surface 82A, and a surface 82C positioned on the right of the surface 82A.

As shown in FIGS. 5 and 10, the surface 82A is inclined with respect to the front-rear direction so as to face frontward and upward. The surface 82A is a flat surface extending in the front-rear direction and the left-right direction. The surface 82A faces upward and frontward. The surface 82B is continuous with the left end of the surface 82A and faces leftward. The surface 82C is continuous with the right end of the surface 82A and faces rightward. The length of the surface 82A in the left-right direction is smaller than the length of the surface 82B in the left-right direction. The length of the surface 82A in the left-right direction is smaller than the length of the surface 82C in the left-right direction. The length of the surface 82A in the left-right direction is equal to the length of the surface 81A in the left-right direction. The length of the surface 82A in the front-rear direction is greater than the length of the surface 81A in the front-rear direction.

The third upper surface 83 is continuous with the rear end of the surface 82C of the second upper surface 82. The third upper surface 83 is a plane orthogonal to the up-down direction. The third upper surface 83 is positioned above the first upper surface 81. A rear end of the third upper surface 83 is continuous with the operation surface 68. The third upper surface 83 has a contact surface 92. The contact surface 92 extends rearward from a lower end of a locking surface 87 of a second key portion 78 described later.

As shown in FIGS. 5 and 6, the second key portion 78 is positioned on the third upper surface 83 of the container body 31. The second key portion 78 protrudes upward from the third upper surface 83. The second key portion 78 is positioned above the supply port 34. An upper end of the second key portion 78 is positioned above the upper surface of the electrode 61 of the IC board 60. The second key portion 78 is positioned rearward of the IC board 60 in the front-rear direction. The second key portion 78 is positioned frontward of the operation surface 68.

When the protrusion 52 of the container body 31 is in contact with the upper end of the through hole 58 of the cover 32, the cover 32 is positioned at the lowest position with respect to the container body 31. In a state where the cover 32 is positioned at the lowest position with respect to the container body 31, the upper end of the second key portion 78 is positioned above the IC board 60.

The second key portion 78 has a first frontward inclined surface 84A, a second frontward inclined surface 84B, a left inclined surface 85A, a right inclined surface 85B, an upper end surface 86, and a locking surface 87. The first frontward inclined surface 84A is a flat surface and is inclined such that a distance with regard to the supply port 34 in the up-down direction gradually increases from a front end of the second key portion 78 toward a rear end of the second key portion 78.

The first frontward inclined surface 84A is continuous with the rear end of the surface 82B of the second upper surface 82. The second frontward inclined surface 84B is a flat surface inclined with respect to the front-rear direction so as to face upward and frontward.

The second frontward inclined surface 84B extends leftward as the second frontward inclined surface 84B extends rearward from the front end thereof. The rear end of the second frontward inclined surface 84B is continuous with the upper end surface 86. The lower end of the second frontward inclined surface 84B is continuous with the third upper surface 83. The left end of the second frontward inclined surface 84B is continuous with the right end of the first frontward inclined surface 84A. A boundary between the first frontward inclined surface 84A and the second frontward inclined surface 84B extends leftward from the front end toward the rear.

An upper end of the boundary between the first frontward inclined surface 84A and the second frontward inclined surface 84B is continuous with the upper end surface 86. The upper end surface 86 is a flat surface facing upward. An upper end of the locking surface 87 is continuous with a rear end of the upper end surface 86. In other words, the upper end surface 86 is positioned between the second frontward inclined surface 84B and the locking surface 87 in the front-rear direction.

The locking surface 87 is a flat surface facing rearward. In the attached state where the ink cartridge 30 is attached to the cartridge case 110, the locking surface 87 and the contact surface 92 are in contact with the locking portion 139 of the cartridge case 110. The lock surface 87 is an example of a contact surface.

The left inclined surface 85A is a flat surface inclined with respect to the left-right direction so as to extend upward from the left end toward the right end. The left inclined surface 85A is continuous with a left end of the first frontward inclined surface 84A. A boundary between the left inclined surface 85A and the first frontward inclined surface 84A extends rightward from the front end toward the rear end. A rear end of the boundary between the left inclined surface 85A and the first frontward inclined surface 84A is continuous with the upper end surface 86.

The right inclined surface 85B is a flat surface that is inclined with respect to the left-right direction so as to extend upward from the right end toward the left end. The right inclined surface 85B is continuous with the right end of the second frontward inclined surface 84B. A boundary between the right inclined surface 85B and the second frontward inclined surface 84B extends leftward from the front end toward the rear end.

A rear end of the boundary between the right inclined surface 85B and the second frontward inclined surface 84B is continuous with the upper end surface 86. The rear end of the right inclined surface 85B is continuous with the locking surface 87.

Since the second key portion 78 has the first frontward inclined surface 84A, the second frontward inclined surface 84B, the left inclined surface 85A, and the right inclined surface 85B, the strength of the second key portion 78 is higher than in a case where the second key portion 78 has a surface extending in the up-down direction. Therefore, the second key portion 78 is not easily deformed by an impact from the right and left direction.

As shown in FIGS. 5 and 8, a first angle θ1 formed between the second frontward inclined surface 84B and a horizontal plane is smaller than a second angle θ2 formed between the left inclined surface 85A and a horizontal plane. A third angle θ3 formed between the right inclined surface 85B and a horizontal plane may be different from the second angle θ2 formed between the left inclined surface 85A and a horizontal plane. The first angle θ1 is, for example, within a range of 5° to 10°, and is 7° in the present embodiment. The second angle θ2 is, for example, within a range of 30° to 40°. The third angle θ3 is, for example, within a range of 30° to 40°.

As shown in FIG. 11, the position of the second key portion 78 (78A, 78B, 78C, and 78D) in the left-right direction may be different among the four ink cartridges 30 (30A, 30B, 30C, and 30D). This difference in the position of the second key portion 78 (78A, 78B, 78C, and 78D) corresponds to the difference in the position of the second key slots 138 (138A, 138B, 138C, and 138D) in the slots 108 (108A, 108B, 108C, and 108D). This difference in the positions of the second key portion 78 (78A, 78B, 78C, and 78D) also corresponds to the difference of the characteristic of the ink cartridges 30 (30A, 30B, 30C, and 30D) (referred to as a second characteristic).

In this embodiment, the position of the second key portion 78 (78A, 78B, 78C, and 78D) in the left-right direction is different among the four ink cartridges 30 (30A, 30B, 30C, and 30D). Nevertheless, in another embodiment, the position of the second key portion 78 (78A, 78B, 78C, and 78D) in the left-right direction may be the same among the four ink cartridges 30 (30A, 30B, 30C, and 30D), but the shape of the second key portion 78 (78A, 78B, 78C, and 78D) may be different among the four ink cartridges 30 (30A, 30B, 30C, and 30D). In such a case, the position of the second key slots 138 (138A, 138B, 138C, and 138D) in the slots 108 (108A, 108B, 108C, and 108D) may be the same, but the shape of the second key slots 138 (138A, 138B, 138C, and 138D) in the slots 108 (108A, 108B, 108C, and 108D) may be different corresponding to the difference in shape of the second key portion 78 (78A, 78B, 78C, and 78D). As such, the mechanical characteristic, e.g., position or shape, of the second key portion 78 (78A, 78B, 78C, and 78D) is different among the four ink cartridges 30 (30A, 30B, 30C, and 30D). That is, the second key portion 78 has a shape and/or position at the cover 32 which is associated with a corresponding second characteristic of the ink cartridge 30.

The characteristic indicated by the second key portion 78 may be the same as or different from the characteristic indicated by the first key portion 77 or the third key portion 79. In the present embodiment, the characteristic of the ink cartridge 30 indicated by the second key portion 78 is the composition of the ink stored in the chamber 46. The position of the second key portion 78 on the second upper surface 82 in the left-right direction varies depending on the composition of the ink stored in the chamber 46. The composition of the ink means what kind of components the ink contains and/or how much amount of the components the ink contains. Examples of the components are a dye and a pigment. In this embodiment, the composition of the ink as the characteristic of the ink cartridge 30 means whether the ink contains a dye or a pigment. The composition of the ink is an example of the characteristic of the ink.

As shown in FIG. 8, a length M1 of the first key portion 77 in the left-right direction is smaller than a length M2 of the second key portion 78 in the left-right direction, that is, a maximum width of the second key portion 78 in the left-right direction.

As shown in FIG. 5, a length M3 of the front end of the first key portion 77 in the up-down direction is greater than the length M4 of the second key portion 78 in the up-down direction, that is, a maximum height of the second key portion 78 in the up-down direction. The length M4 corresponds to a length of the locking surface 87 of the second key portion 78 in the up-down direction. The maximum height of the second key portion 78 in the up-down direction is less than the maximum width of the second key portion 78 in the left-right direction.

As shown in FIG. 5, a first distance N1, which is the shortest distance between the center of the supply port 34 and the first key portion 77, is smaller than a second distance N2, which is the shortest distance between the center of the supply port 34 and the second key portion 78. With such a configuration, as will be described later, when the rear end of the container body 31 is rotated upward about the supply port 34, the length of the trajectory of rotation of the first key portion 77 is smaller than the length of the trajectory of rotation of the second key portion 78.

As shown in FIG. 11, an ink cartridge set 300 includes a plurality of ink cartridges 30. The ink cartridges 30 included in the ink cartridge set 300 have different mechanical characteristics such as the position and/or the shape of the first key portion 77, the second key portion 78, and the third key portion 79 depending on the difference in the characteristics of the ink cartridges 30. The positions of the first key portions 77 of the four ink cartridges 30 in the left-right direction are different depending on the colors of the inks stored in the ink cartridges 30. The positions of the second key portions 78 of the four ink cartridges 30 in the left-right direction are different depending on the compositions of the inks stored in the ink cartridges 30. In this specific embodiment, the composition of the ink means whether the ink contains a dye or a pigment. The positions and/or shapes of the third key portions 79 of the four ink cartridges 30 are different depending on the sales areas of the printers in which the cartridges 30 are used.

The ink cartridge 30A in FIG. 11 corresponds to the ink cartridge 30 illustrated in FIGS. 3 to 10.

The position of the first key portion 77 in the left-right direction corresponds to the position of the first key slot 115 of the cartridge case 110.

The first key portion 77A of the ink cartridge 30A, which is positioned on the rightmost side in FIG. 11, is positioned to the right of the center of the ink cartridge 30A in the left-right direction on the lower surface 70. The ink cartridge 30A stores a magenta ink which contains a dye as a coloring agent. The first key portion 77B of the ink cartridge 30B, which is positioned second from the right in FIG. 11, is positioned further to the left than the first key portion 77A of the ink cartridge 30A in the left-right direction on the lower surface 70. The ink cartridge 30B stores a cyan ink which contains a dye as a coloring agent. The first key portion 77C of the ink cartridge 30C, which is positioned third from the right in FIG. 11, is positioned further to the left than the first key portion 77B of the ink cartridge 30B in the left-right direction on the lower surface 70. The ink cartridge 30C stores a yellow ink which contains a dye as a coloring agent. The first key portion 77D of the ink cartridge 30D, which is positioned on the leftmost side in FIG. 11, is positioned further to the left than the first key portion 77C of the ink cartridge 30C in the left-right direction on the lower surface 70. The ink cartridge 30D stores a black ink which contains a pigment as a coloring agent.

The positions in the left-right direction of the second key portions 78A, 78B, 78C, and 78D of the ink cartridges 30A, 30B, 30C, and 30D correspond to the positions of the respective second key slots 138 of the cartridge case 110.

Each of the second key portions 78A, 78B, and 78C of the ink cartridges 30A, 30B, and 30C is positioned further leftward than the center of the second upper surface 82 in the left-right direction. The second key portion 78D of the ink cartridge 30D is positioned to the right of the center of the second upper surface 82 in the left-right direction.

In the present embodiment, since the four ink cartridges 30 shown in FIG. 11 are used in the same sales area, the positions and shapes of the third key portions 79 are the same.

[Attachment of Ink Cartridge 30 to Cartridge Case 110]

As shown in FIG. 12, the ink cartridge 30 is inserted into a predetermined slot 108 of the cartridge case 110 in the frontward direction. In other words, the ink cartridge 30 is inserted such that the front wall 53 of the ink cartridge 30 faces the end surface 103 of the case body 101. The ink cartridges 30A, 30B, 30C, and 30D storing magenta, cyan, yellow, and black inks, respectively are inserted into the four slots 108A, 108B, 108C, and 108D, respectively.

Hereinafter, an example in which an ink cartridge 30A storing magenta ink is inserted into the rightmost slot 108A in the left-right direction will be described. The ink cartridge 30A storing magenta ink is positioned at the rightmost position in FIG. 11. The user pushes the first rear surface 63 of the ink cartridge 30A frontward with the finger and inserts the ink cartridge 30A frontward into the cartridge case 110.

As shown in FIGS. 13A and 13B, the ink cartridge 30A is inserted into the slot 108A through the opening 112 of the case body 101. The lower surface 47 of the inserted ink cartridge 30A is supported by the guide surface 161 of the case body 101 shown in FIG. 2. Before the supply port 34 of the ink cartridge 30A reaches the supply tube 102, the second key portion 78A reaches a position directly below the second key slot 138A of the case body 101.

The second key portion 78A of the ink cartridge 30A is positioned on the left with respect to the center of the second upper surface 82 in the left-right direction. On the other hand, the second key slot 138A is positioned on the left with respect to the center of the slot 108A in the left-right direction. Therefore, when the ink cartridge 30A is further inserted frontward, as shown in FIGS. 14A and 14B, the second key portion 78A moves directly below the second key slot 138A.

When this occurs, the second frontward inclined surface 84B of the second key portion 78A comes into contact with the locking portion 139, whereby a downward force is applied to the ink cartridge 30A. When the downward force is applied to the second frontward inclined surface 84B of the second key portion 78A, the ink cartridge 30A rotates clockwise as shown in FIGS. 14A and 14B.

As a result, the lower surface 47 of the supply portion 33 which defines the lower end of the ink cartridge 30A comes into contact with the guide surface 161 of the case body 101, and the second key portion 78A moves frontward while coming into contact with the locking portion 139.

Further, the first key portion 77A enters the first key slot 115A in a state where the supply portion 33 is in contact with the guide surface 161 of the case body 101 and the second frontward inclined surface 84B of the second key portion 78A is in contact with the locking portion 139. Further, one of the pair of walls 71 enters the groove 113. The other one of the pair of walls 71 enters the groove 114. Further, the rib 118 enters one of the two grooves 74. The rib 119 enters the other one of the two grooves 74. One of the pair of walls 71 enters the groove 113, and the other enters the groove 114, whereby the cover 32 is guided frontward.

When the rib 118 enters one of the two grooves 74 and the rib 119 enters the other one of the two grooves 74, the cover 32 is positioned with respect to the cartridge case 110 in the up-down direction. In other words, the position of the cover 32 with respect to the cartridge case 110 in the up-down direction is determined.

The second front surface 73 of the one of the pair of walls 71 moves frontward while being in contact with the lower surface of the groove 113 and the second front surface 73 of the other one of the pair of walls 71 moves frontward while being in contact with the lower surface of the groove 114, whereby one of the walls 71 is guided into the groove 113 and the other is guided into the groove 114 in the up-down direction.

Further, when the first front surface 72 of one of the walls 71 or the lower front surface 75L of the cover 32 comes in contact with the rib 118 as the ink cartridge 30A moves frontward, the rib 118 is guided into the groove 74 in the up-down direction.

When the first front surface 72 of the other one of the walls 71 or the lower front surface 75L of the cover 32 comes in contact with the rib 119 as the ink cartridge 30A moves frontward, the rib 119 is guided into the groove 74 in the up-down direction.

In addition, when the first key portion 77A of the ink cartridge 30A enters the first key slot 115A, the side surfaces 77S of the first key portion 77A shown in FIGS. 4 and 8 moves frontward while being into contact with the pair of protruding pieces 117, and thus the first key portion 77A is guided into the first key slot 115A in the left-right direction. While the first key portion 77A of the ink cartridge 30A enters the first key slot 115A, the second key portion 78A enters the second key slot 138A. In addition, while the second key portion 78A enters the second key slot 138A, the second frontward inclined surface 84B and the upper end surface 86 sequentially come into contact with the locking portion 139.

As shown in FIGS. 14A and 14B, a downward and rearward force acts on the container body 31 in a state where the second frontward inclined surface 84B is in contact with the locking portion 139, and a downward force acts on the container body 31 in a state where the upper end surface 86 is in contact with the locking portion 139.

When the second frontward inclined surface 84B or the upper end surface 86 slides on the locking portion 139, the lower surface 47 of the container body 31 slides on the guide surface 161.

When the first key portion 77A of the ink cartridge 30A enters the first key slot 115A, the lower surface 77L of the first key portion 77A comes into contact with the upper end 136 of the pressing plate 134.

When the first key portion 77A of the ink cartridge 30A enters the first key slot 115A, the lower surface 77L of the first key portion 77A presses the pressing plate 134 downward to move the ink receiving member 130 from the first position to the second position.

When this occurs, an upward force originated from the urging, i.e., pulling force of the coil spring 133 acts on the cover 32 via the ink receiving member 130 and the pressing plate 134, but the surfaces 74L and 74U of the groove 74 shown in FIG. 8 is in contact with the rib 118, whereby the cover 32 is positioned with respect to the cartridge case 110 in the up-down direction. As a result, the cover 32 does not move upward.

The pressing plate 134 moves downward against the urging force of the coil spring 133. When the pressing plate 134 moves downward, the ink receiving member 130 moves from the first position shown in FIGS. 13A and 13B to the second position shown in FIGS. 14A and 14B.

When the first key portion 77A of the ink cartridge 30A enters the first key slot 115A, the side surfaces 77S of the first key portion 77A are guided in the front-rear direction by the two protruding pieces 117. Thus, the cover 32 is guided in the front-rear direction in the slot 108A.

When the ink receiving member 130 is in the second position, the supply port 34 is connected to the supply pipe 102 as the ink cartridge 30A moves forward. The supply tube 102 pushes the valve 36, and the valve 36 moves rearward against the biasing force of the coil spring 37. The outer peripheral surface of the supply tube 102 connected to the supply portion 33 is in contact with the seal member 35 so as not to leak the ink.

Figure 15A:
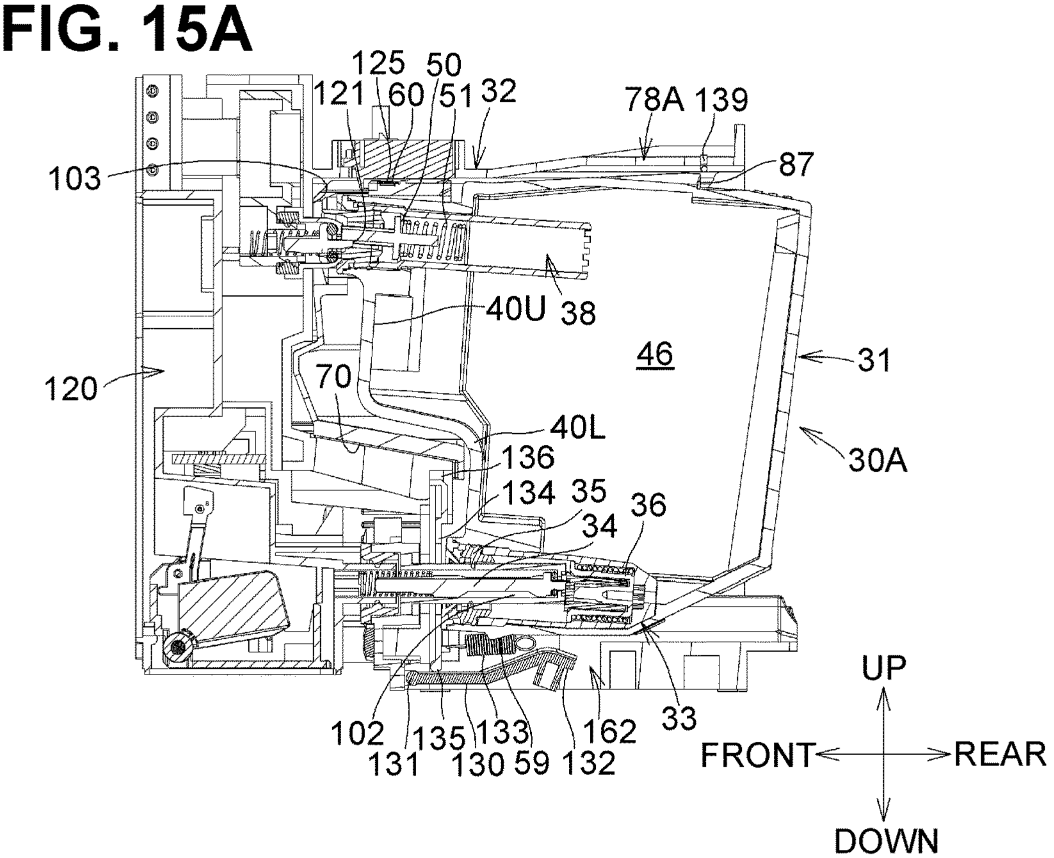
FIGS. 15A and 15B are cross-sectional views of the ink cartridge 30 and the cartridge case 110, each showing a state where the ink cartridge 30 is positioned in the cartridge case 110 and a supply tube 102 is inserted into a supply port 34.
Figure 15B:
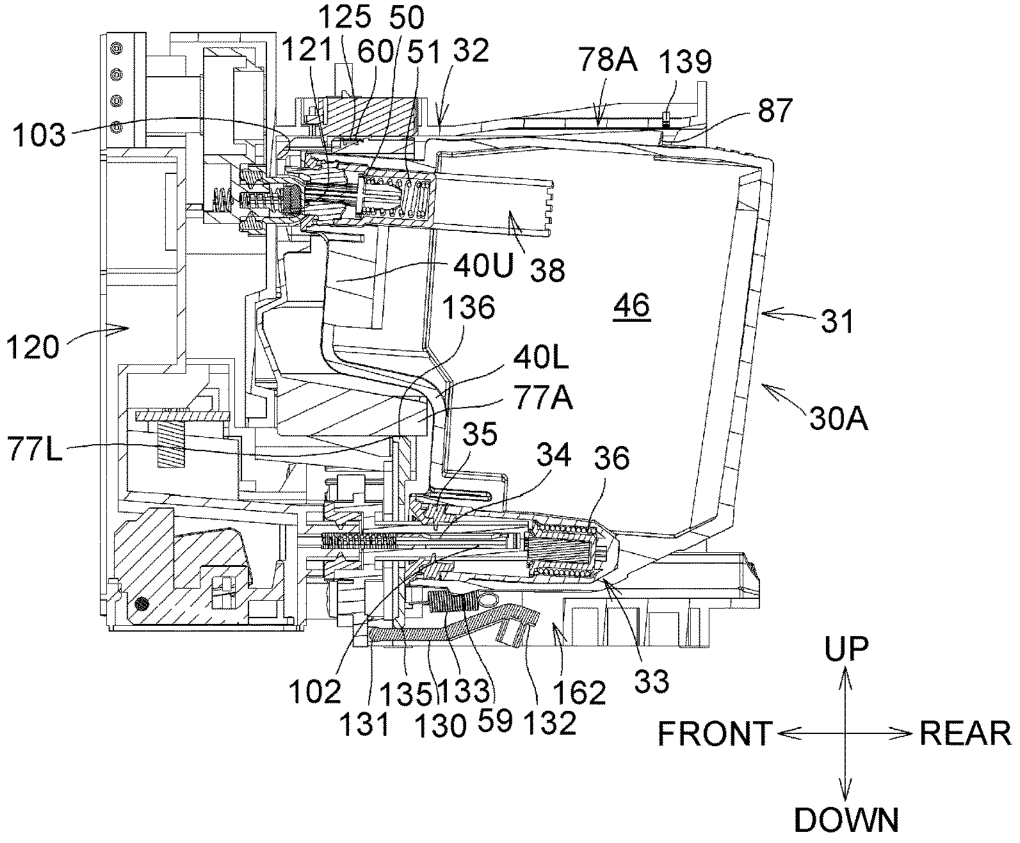

As shown in FIGS. 15A and 15B, as the ink cartridge 30A moves frontward, the rod 121 of the slot 108A comes into contact with the valve 50 of the atmosphere opening passage 38 through the opening of the cover 32. The rod 121 pushes the valve 50, and the valve 50 moves rearward against the urging force of the coil spring 51. When the valve 50 moves rearward, the atmosphere opening passage 38 is opened to allow air to flow between the outside and the chamber 46.

Further, the electrodes 61 of the IC board 60 comes into contact with the contacts 125 and are electrically connected to the contacts 125. Further, the locking surface 87 of the second key portion 78A is positioned frontward of the locking portion 139. The contact surface 92 is positioned directly below the locking portion 139.

When the first key portion 77 enters the first key slot 115A, the lower surface 77L of the first key portion 77 comes into contact with the pressing plate 134. The first key portion 77 receives an upward force from the pressing plate 134 toward the electrode 61. The contacts 125 are elastically deformable like a leaf spring, the contacts 125 apply a downward contact pressure to the electrodes 61 when the electrodes 61 contact the contacts 125. Further, the biasing force of the coil spring 133 indirectly acting upward on the cover 32.

Although the contacts 125 apply the downward contact pressure to the electrodes 61 and the coil spring 133 applies the upward pressure to the first key portion 77A, the surface 74L or 74U of the grooves 74 absorbs the upward or downward pressure by the rib 118 and the rib 119 coming into contact with the surface 74L or 74U of the grooves 74. Accordingly, the force acting upward to the cover 32 and the force acting downward to the cover 32 are balanced.

Further, as shown in FIG. 15B, the position in the front-rear direction at which the upper end 136 of the pressing plate 134 is in contact with the first key portion 77A is different from the position in the front-rear direction at which the contacts 125 are in contact with the electrodes 61. Specifically, the position in the front-rear direction at which the upper end 136 of the pressing plate 134 is in contact with the first key portion 77A is positioned frontward of the position in the front-rear direction at which the contacts 125 are in contact with the electrodes 61. As a result, a force acts on the cover 32 to rotate the cover 32 about a rotation axis extending in the left-right direction such that the rear end side of the cover 32 moves more upward than the front end side thereof. On the other hand, as shown in FIG. 17, the rib 118 and the rib 119 come into contact with the surfaces 74L, 74U of the grooves 74, whereby the rotation of the cover 32 is suppressed.

Figure 17:
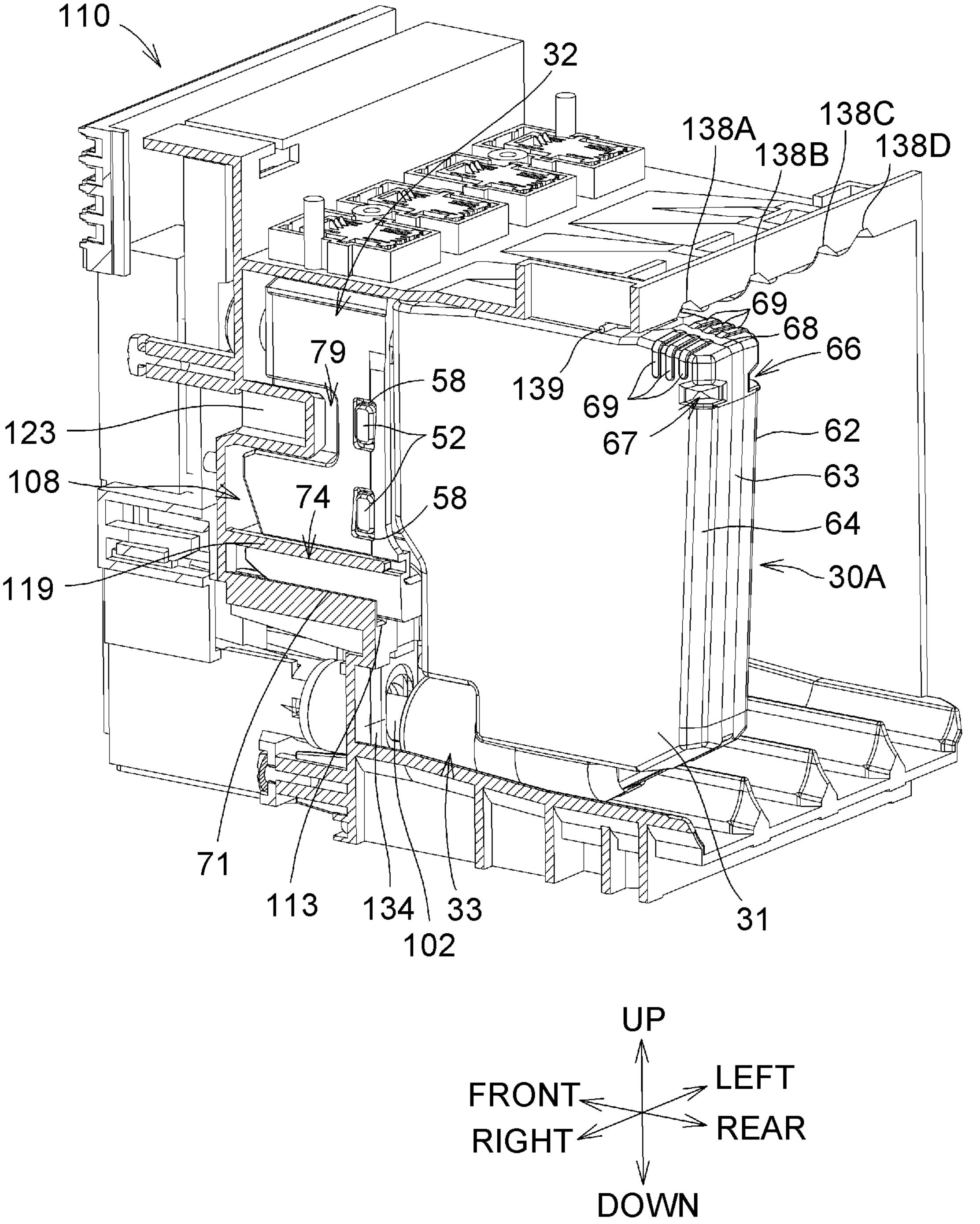
FIG. 17 is a partial cross-sectional perspective view of the ink cartridge 30 and the cartridge case 110, showing the attached state of the ink cartridge 30 where the ink cartridge 30 is attached to the cartridge case 110.

As shown in FIG. 17, when the ink cartridge 30A is inserted to be in the attached state in the slot 108A, the third key portions 79 matches with the fitting piece 122 and the fitting piece 123.

It is assumed that an ink cartridge 30 which is sold in a different area and which is not provided with one of the recessed portions of the third key portion 79 formed in the left wall 54 and the right wall 55 of the cover 32 is inserted into the slot 108D. In the slot 108D, the fitting piece 122 is positioned on the right side, and the fitting piece 123 is positioned on the left side. In the ink cartridge 30 in which one of the recessed portions of the third key portion 79 formed in the left wall 54 and the right wall 55 of the cover 32 is not provided, the front wall 53 of the cover 32 comes into contact with one of the fitting piece 122 and the fitting piece 123. Thus, the ink cartridge 30 cannot be further inserted into the slot 108D in the frontward direction. Since the ink cartridge 30 cannot be inserted into the slot 108D, it means that the ink cartridge 30 is identified as an ink cartridge 30 that is intended to be used in a printer sold in a sales area different from that of the printer 10.

In the state shown in FIGS. 15A and 15B, the container body 31 is rotatable around the supply port 34 such that the rear end thereof is to be moved downward and upward in a state where the container body 31 is inserted in the slot 108A. More specifically, the container body 31 is rotatable around an axis extending in the left-right direction and passing through the center of the supply port 34 so that the rear end side thereof moves upward in the slot 108A. Although the position of the cover 32 with respect to the cartridge case 110 in the up-down direction is determined as described before, because the through hole 58 of the cover 32 is sufficiently larger than the outer shape of the protrusion 52 of the container body 31, the container body 31 can rotate like this.

Figure 16A:
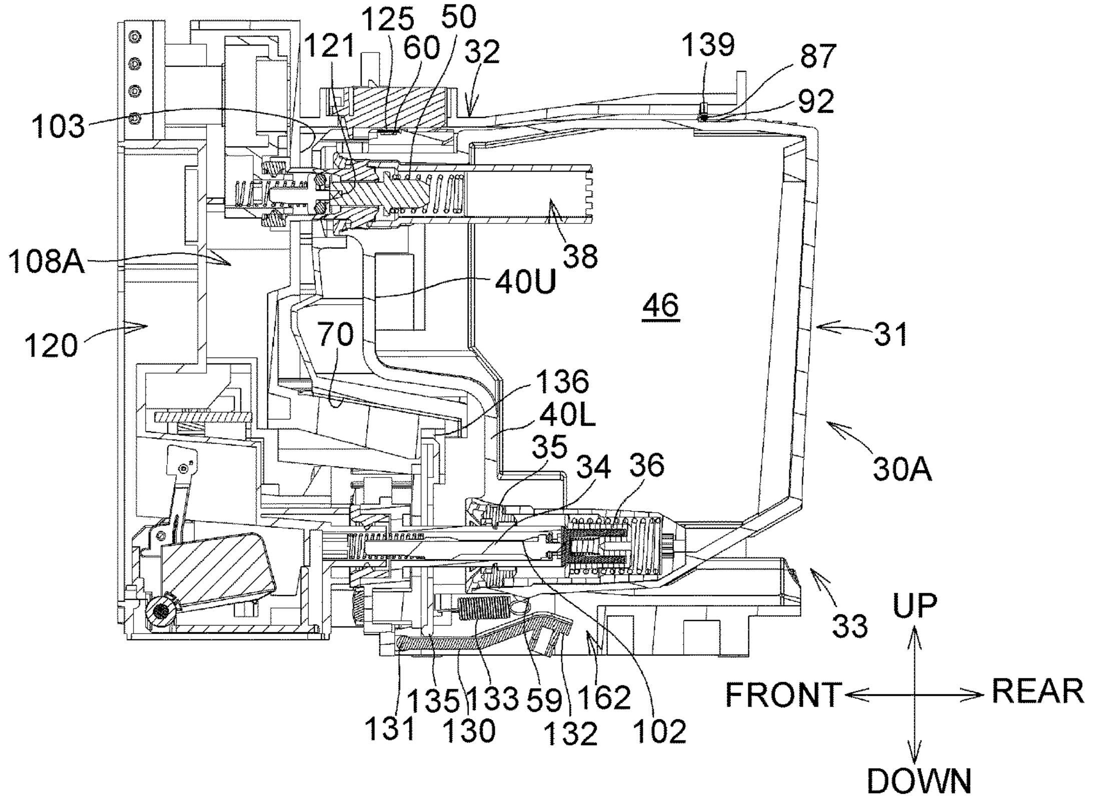
FIGS. 16A and 16B are cross-sectional views of the ink cartridge 30 and the cartridge case 110, each showing an attached state of the ink cartridge 30 where the ink cartridge 30 is attached to the cartridge case 110.
Figure 16B:
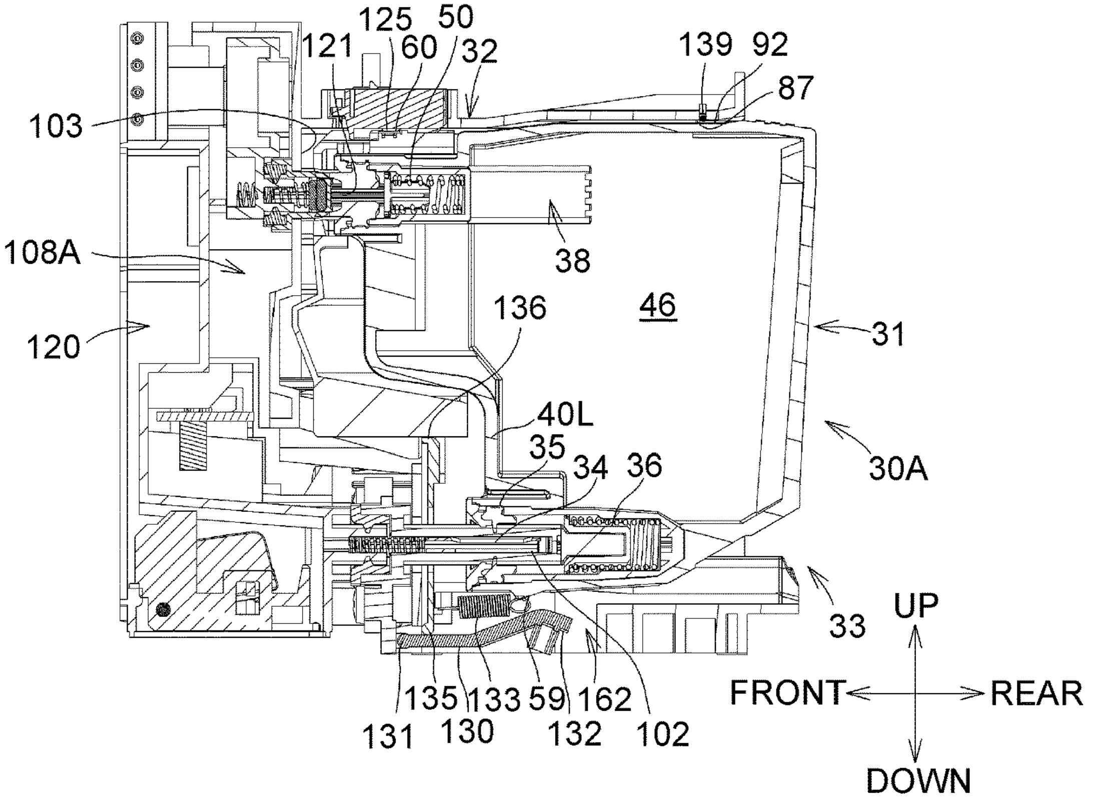

When the ink cartridge 30A rotates so that the rear end side moves upward, the locking surface 87 of the second key portion 78A and the locking portion 139 face each other in the front-rear direction. When the user removes his/her fingers from the ink cartridge 30A, the ink cartridge 30A is moved rearward by the urging forces of the coil spring 37 and the coil spring 51, and the locking surface 87 comes into contact with the locking portion 139 as shown in FIGS. 16A and 16B. Accordingly, the ink cartridge 30A is held in the attached state. Further, the contact surface 92 comes into contact with the locking portion 139. As a result, the container body 31 of the ink cartridge 30A is positioned in the up-down direction with respect to the cartridge case 110. In other words, the position of the ink cartridge 30A with respect to the cartridge case 110 in the up-down direction is determined.

In the attached state where the ink cartridge 30A is held in the cartridge case 110, the internal space, i.e., the chamber 46 of the ink cartridge 30A communicates with the atmosphere through the atmosphere opening passage 38. As a result, the ink in the chamber 46 flows into the internal space of the supply tube 102 through the internal space of the supply portion 33.

In addition, although the ink cartridge 30A is urged rearward by the coil spring 37 and the coil spring 51, the locking surface 87 of the ink cartridge 30A and the locking portion 139 of the cartridge case 110 come into contact with each other, and thus the rearward movement of the ink cartridge 30A is suppressed. As a result, the ink cartridge 30A is held in the cartridge case 110.

In addition, in the attached state where the ink cartridge 30A is held in the cartridge case 110, the electrodes 61 of the IC board 60 are in contact with the contacts 125. Further, the electrodes 61 are electrically connected to the contacts 125 so that the IC can communicate with the control unit of the printer 10 via the electrodes 61 and the contacts 125.

It is assumed that the ink cartridge 30A is erroneously inserted into the slot 108B of the cartridge case 110 shown in FIG. 2. The first key slot 115B is closer to the groove 114 in the slot 108B than the first key slot 115A is to the groove 114 in the slot 108A in the left-right direction. Therefore, since the positions in the left-right direction of the first key portion 77A of the ink cartridge 30A and the first key slot 115B of the slot 108B are shifted from each other, the first key portion 77A cannot enter the first key slot 115B and comes into contact with the rear wall 173. Since the front surface 77F of the first key portion 77A comes into contact with the rear wall 173, the ink cartridge 30A cannot be further inserted into the slot 108B. Since the ink cartridge 30A cannot be inserted into the slot 108B, the user understands that the ink cartridge 30A is not the ink cartridge 30 to be inserted into the slot 108B.

It is assumed that an ink cartridge 30 having the first key portion 77 at the same position as the ink cartridge 30A and the second key portion 78 at the same position as the ink cartridge 30D is inserted into the rightmost slot 108A of the cartridge case 110 shown in FIG. 2. In the rightmost slot 108A, the first key slot 115A is positioned on the right side of the slot 108A in the left-right direction, corresponding to the position of the first key portion 77 of the ink cartridge 30A. Therefore, the first key portion 77 of the ink cartridge 30 can enter the first key slot 115A. On the other hand, the second key slot 138A is positioned on the left side with respect to the center of the slot 108A in the left-right direction, corresponding to the position of the second key portion 78 of the ink cartridge 30A, not of the ink cartridge 30D. Therefore, since the second key portion 78 of this ink cartridge 30 and the second key slot 138A of the slot 108A are misaligned in the left-right direction, the upper end surface 86 comes into contact with the case body 101 before the second key portion 78 enters the second key slot 138A as the ink cartridge 30 rotates. As a result, since the locking surface 87 and the locking portion 139 do not face with each other in the front-rear direction, the ink cartridge 30A is not held in the slot 108D. Since the container body 31 cannot be rotated, the user understands that the ink cartridge 30 is not the ink cartridge 30 to be inserted into the slot 108A.

Next, the movement of the ink cartridge 30A, which is in the attached state where the ink cartridge 30A attached to the cartridge case 110, is detached and removed from the cartridge case 110 will be described.

As shown in FIG. 17, in the attached state, the rib 118 and the rib 119, which are in contact with the grooves 74, restrict the up-down movement and rotation of the cover 32.

Since the container body 31 is relatively movable with respect to the cover 32, only the container body 31 is rotatable around the supply port 34, more specifically, around the axis extending in the left-right direction and passing through the center of the supply port 34, even when the movement in the up-down direction and the rotation of the cover 32 are restricted.

By the rotation of the container body 31, the locking surface 87 and the locking portion 139 selectively contact with each other and are separated from each other in the up-down direction.

In the attached state, when the user presses down the operation surface 68 of the container body 31 with a finger, the rear end side of the container body 31 moves downward. Thus, the locking surface 87 and the locking portion 139 are separated from each other in the up-down direction. When the user removes his/her finger from the operation surface 68, the ink cartridge 30 is moved rearward in the slot 108A by the urging forces of the coil spring 37 and the coil spring 51.

In the attached state, the convex portion 59 of the ink cartridge 30A is positioned in the space 162 of the case body 101. As the ink cartridge 30A moves rearward in the slot 108A, the convex portion 59 also moves rearward in the space 162, and the convex portion 59 comes into contact with the front end of the guide surface 161. As a result, the rearward movement of the ink cartridge 30A is restricted, and as shown in FIGS. 14A and 14B, the ink cartridge 30A does not jump out from the slot 108A, and stands still in a state where the front side of the ink cartridge 30A is positioned in the slot 108A.

Further, as shown in FIGS. 13A and 13B, when the ink cartridge 30A moves rearward, the convex portion 59 of the ink cartridge 30A separates from the guide surface 161 of the slot 108A, and the ink cartridge 30A is taken out from the slot 108A.

Operation and Effect of Present Embodiment

The side surface 77S of the first key portion 77 facing leftward is positioned rightward of the left surface 42S of the container body 31. The side surface 77S facing rightward is positioned leftward of the right surface 43S of the container body 31. The front surface 77F of the first key portion 77 is positioned rearward of the front end of the front wall 53 of the cover 32. When the ink cartridge 30 is dropped onto a floor or the like with the left surface 42S facing downward, the distance between the floor and each side surface 77F of the first key portion 77 is greater than the distance between the floor and the left surface 42S. When the ink cartridge 30 is dropped onto a floor or the like with the right surface 43S facing downward, the distance between the floor and each side surface 77F of the first key portion 77 is greater than the distance between the floor and the right surface 43S. This configuration can suppress the direct collision of the first key portion 77 with the floor or the like. Thus, the first key portion 77 is less likely to be damaged.

Further, the side surface 77S of the first key portion 77 facing leftward is positioned rightward of the left end of the supply portion 33. The side surface 77S of the first key portion 77 facing rightward is positioned leftward of the right end of the supply portion 33. Therefore, when the ink cartridge 30 is dropped on the floor or the like with the left surface 42S or the right surface e43S facing downward, the side surface 77S is more distant from the floor than the supply portion 33. This configuration can suppress the direct collision of the first key portion 77 with the floor or the like.

Since the first key portion 77 extends downward from the lower surface 70 of the cover 32 and extends forward from the sub-front wall 88, the strength of the first key portion 77 is increased.

The first key portion 77 is longer in the front-rear direction than in the up-down direction. Thus, the side surface 77S of the first key portion 77 can guide the ink cartridge 30 more easily in the front-rear direction than in the up-down direction.

The lower surface 70 of the cover 32 is inclined surface inclined such that a rear end of the lower surface 70 is positioned downward of a front end of the lower surface 70. Therefore, the lower surface 77L of the first key portion 77 is located higher on the front end side than on the rear end side.

Therefore, the front end of the first key portion 77 of the ink cartridge 30 can easily enter the first key slot 115 of the cartridge case 110.

When the first key portion 77 receives an upward force from the pressing plate 134 toward the electrode 61, as shown in FIG. 15A, the counterclockwise rotation of the ink cartridge 30 around the supply port 34, as a center of the rotation, is suppressed. The configuration can suppress the pressure applied by the contacts 125 of the cartridge case 110 coming into contact with the plurality of electrodes 61 of the IC board 60 becoming uneven. As a result, the electrical conduction between the contact 125 and the electrode 61 can be stable.

Since the groove 74 extending in the front-rear direction is positioned above the first key portion 77, the surface 74U and the surface 74L of the groove 74 restrict excessive movement of the ink cartridge 30 in the up-down direction. On the other hand, when the ink cartridge 30 enters the cartridge case 110, the side surface 77S of the first key portion 77 restricts excessive movement of the ink cartridge 30 in the left-right direction. Therefore, the ink cartridge 30 is smoothly guided by the first key portion 77 and the groove 74 until the ink cartridge 30 is completely attached.

Since the first key portion 77 is positioned between the pair of walls 71 in the left-right direction, the first key portion 77 is protected.

Modification

Figure 18:
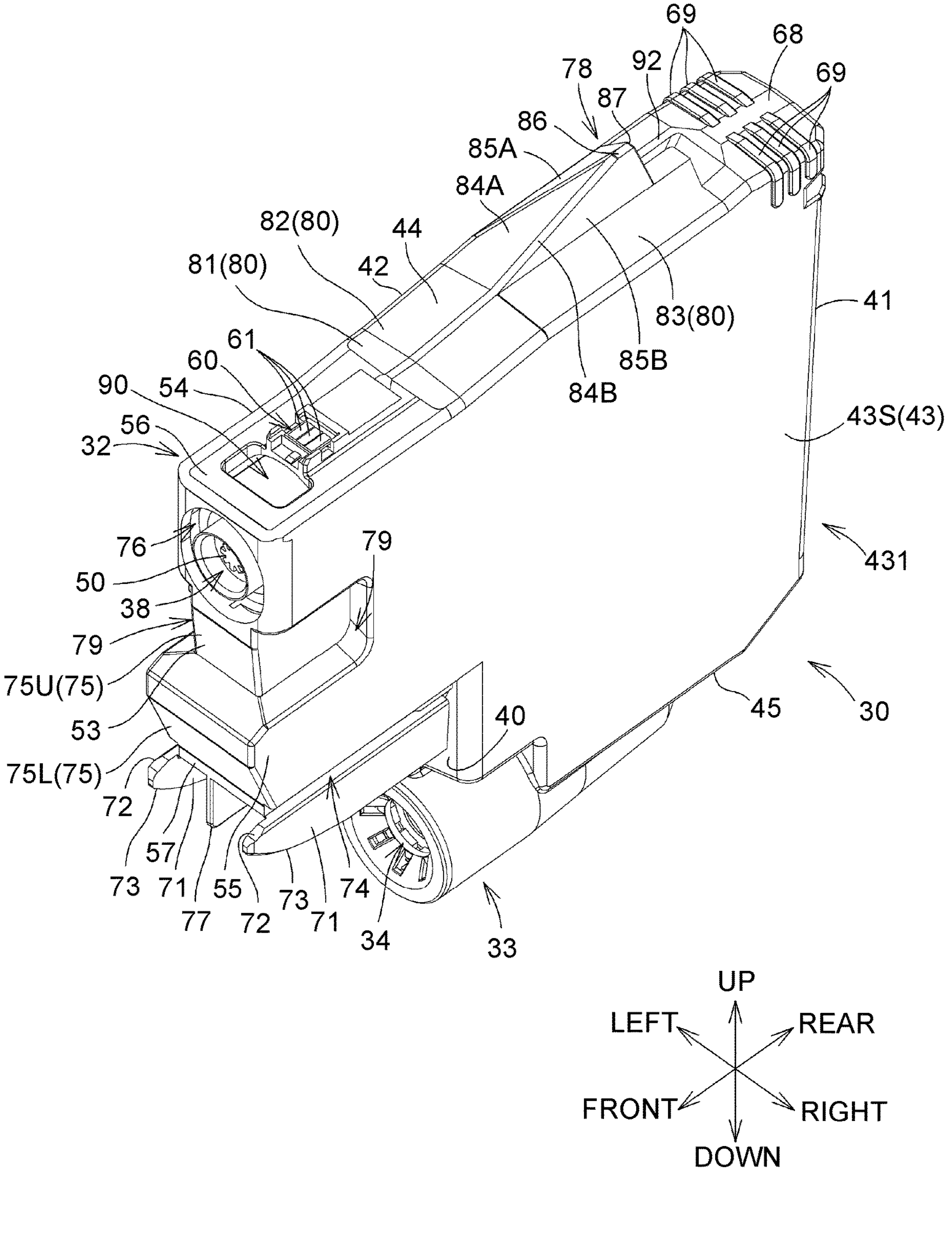
FIG. 18 is a perspective view of an ink cartridge 30 according to a modification, as viewed from the front and above.

In the above-described embodiment, the ink cartridge 30 includes the container body 31 and the cover 32. Alternatively, as shown in FIG. 18, the ink cartridge 30 may have a container 431 in which the container body 31 and the cover 32 are integrally molded. In this case, the container 431 stores ink. Moreover, the distance between the surface 74U and the surface 74L of one of the grooves 74 is greater than the dimension of the rib 118 in the up-down direction and the distance between the surface 74U and the surface 74L of the other of the grooves 74 is greater than the dimension of the rib 119 in the up-down direction, so that there is enough room between the surfaces 74U and the surfaces 74L and the rib 118, 119, respectively, which allows the rotation of the container 431 around the axis extending in the left-right direction and passing through the center of the supply port 34.

The first key portion 77, the second key portion 78, and the IC board 60 are positioned in the container 431. The container 431 integrally including the surface provided with the first key portion 77, the surface provided with the IC board 60, and the internal space that stores ink is another example of a container of the ink container.

In the above-described embodiment, the atmosphere opening passage 38 is positioned on the upper front wall 40U of the container body 31, however the atmosphere opening passage 38 may be positioned on a wall other than the front wall 40 of the container body 31, for example, on the upper wall 44.

In the above-described embodiment, the first key portion 77 functions to guide the ink cartridge 30 and also functions to press the pressing plate 134 of the cartridge case 110 and to mechanically identify the characteristic of the ink cartridge 30. Alternatively, the first key portion 77 functions only to guide the ink cartridge 30.

That is, the mechanical characteristic such as the position and/or the shape of the first key portion 77 may be common among the ink cartridges 30 constituting the ink cartridge set 300.

In the above-described embodiment, the ink cartridge 30 is shown as an example of the ink container. However, the ink container may not be a cartridge attached to the printer 10, but may be a bottle for replenishing ink to a tank or the like of the printer.

In the above embodiments or modifications, the ink supply portion 33 includes a supply port 34 defining a front end portion thereof and configured to receive a supply tube 20 (ink tube) provided in the slot 108 (attachment space). In the supply portion 33 there may be arranged a seal member 35, a valve 36 and a coil spring 37. The coil spring 37 may bias the valve 36 toward the seal member 35 to seal the chamber 40 in the container body 31 or main body 431. However, instead of the seal member 35, a valve 36 and a coil spring 37, other means to seal the chamber, in which ink may be stored, from the outside may be provided, such as an elastic plug, a film or the like, which may be pierced by the supply tube 20, e.g., when formed as a needle.

In the above embodiments or modifications, the supply portion 33 is a cylindrical member and has an outer peripheral surface extending rearward from the supply port 34. The outer peripheral surface is a curved surface curved in a circumferential direction with the front-rear direction as an axis. However, according to modifications, the outer peripheral surface of the supply portion 33 may also comprise multiple flat surfaces arranged adjacent each other. Also, the curved surface may just be provided on a lower section of the peripheral surface of the supply portion in the up-down-direction. Furthermore, the supply portion 33 may be arranged to have an appearance more or less integrated into a parallelepiped shape of the container body 31 or the main body 431.

In the above embodiments or modifications, the supply port 34 is circular when viewed from the front. However, according to modifications, the supply port 34 may have a shape other than a circular shape when viewed from the front. The supply port 34 may have any shape as long as it has a through hole into which the supply tube 102 can be inserted, and the through hole may be sealed by means to seal the chamber, in which ink may be stored, from the outside.

In the above embodiments or modifications, the first key portion 77 as an example of a guide wall and the second key portion 78 are each associated with a first and second characteristic of the ink cartridge, which are described to pertain to ink color and ink composition (for example dye or pigment), respectively. However, the specific characteristics of the ink cartridge may also be vice versa, i.e., the first characteristic may be ink composition and the second characteristic maybe ink color. Also, the first and second characteristics may be different from the above examples, such as sales area or contract type (in the embodiment associate with the third key portion), or still further characteristics. Still further, the concrete characteristics are not bound to the specific embodiments shown in the figures.

It is noted that according to modifications of the above embodiments, the guide wall as provided in the appended claims does not necessarily need to include the function of a key portion, associated with a characteristic of a cartridge and arranged to enter one of the first key slots 115A, 15B, 115C or 15D (receiving portions) of the slots 108.

In the above embodiments or modifications, the first key portion 77 as an example of a guide wall is shown as having a plate shape extending from its front surface 77F in the rear direction up until the sub-front wall 88. However, the first key portion may also be discontinuous (e.g., separate, not connected, and/or spaced away) or even continuous (e.g., integrally formed) with the sub-front wall 88, or there may be no sub-front wall 88 (omitted).

Furthermore, the plate shape can be replaced with a web extending from the sub-front wall 88 of the cover 32, or from the front wall 40 of the container body 31, or the main body 431, respectively, in the front-rear-direction and having the lower surface 77L. Additionally or alternatively, a further web extending in the up-down direction may be provided and having the front surface 77F. Both webs maybe connected with each other and with the respective sub-front wall 88 (if present) and the lower wall 70, respectively. In other words, such modified first key portion 77 may have a hollow shape or the like.

Additionally or alternatively, the first key portion 77 as an example of a guide wall having the lower surface 77L may extend from the front wall 40 only, but not from the lower wall 70. In case of the main body of the cartridge 30 comprising two members, such as for example container body 31 and cover 32, the first key portion 77 may then be integral with the container body 31.

Also, in another embodiment, the first key portion 77 as an example of a guide wall may itself include a movable mechanism. When the ink cartridge in inserted into the slot 108, a first contact portion of the movable mechanism contacts a portion of the slot 108 of the cartridge case 110, and the resulting urging force onto the contact portion is translated into a downward movement of a second contact portion of the movable mechanism, which includes the lower surface 77L, and which then presses down the pressing plate 134. The movable mechanism may include a resilient member that holds the first contact portion and the second contact portion in place before the contact is achieved during insertion of the cartridge.

In a more refined embodiment, the first key portion 77 as an example of a guide wall may itself include a modified movable mechanism, in which a rotatable lever is provided at the ink cartridge, which, during insertion, firmly contacts the pressing plate by its contact portion, and during further insertion of the ink cartridge 30 rotates pressing the pressing plate 134 further down via its contact portion. The movable mechanism may also be a rotatable wheel, which during insertion "rolls" over the pressing plate 134 thereby pressing it down and also optionally enters the respective receiving portion 115A, 115B 115C or 115D, provided in the slot 108 in the left-right direction (if the position and shape of the wheel fits or matches the respective receiving portion).

Furthermore, in the above embodiments or modifications, the second key portion is described as having a ramp shape, via surfaces 84A, 84B, with laterally inclined surfaces 85A, 85B. However, according to modified embodiments, the second key portion may also just be formed of a ramp-shaped plate extending in the front-rear-direction and the up-down direction, thus having a thin inclined ramp surface and optionally having a thin locking surface facing a direction opposite the insertion direction. The thickness of that plate corresponds to the width of the second key portion in such case. In another modification, the second key portion 78 has the surface 85A, 85B, which are, however, not inclined but extend in the up-down-direction thus approaching each other when viewed towards the rear direction.

Still further, it is noted that when it is described herein that the first or second key portions and the first or second or receiving portions fit or match with each other, it does not necessarily mean the shapes and/or position, or cross sections in a plane perpendicular to the direction of movement, are exactly complementary with each other. These key portions may rather be formed as protrusions which may deviate in shape and cross section from the shape and cross section of the hollow spaces defined by the respective receiving portions. Modified embodiments comprising such key portions are encompassed by the appended claims. Nevertheless, the fitting and matching function described above requires at least, that the first key portions be positioned and shaped to be accommodated in the first receiving portions and the second key portions be positioned and shaped to be accommodated in the second receiving portions, respectively.

Moreover, it is noted that the specific structure of the first and second key portions 77, 78 shown in the above embodiments may also be realized in cartridges (not shown), in which, for example, the rear wall 43 is simply flat and does not have the second and third inclined surfaces 64, 65, and/or the lower wall 45 has the first and second lower walls 45A, 45B including the specific structure shown. The rear wall 43 may also have a convex rounded or even any other shape.

Furthermore, the pair of walls 71 may be omitted in further modified embodiments, or the shape of the walls 71 may be arranged differently. For example, the first and second front surfaces 72, 73 may not be rounded but define a rectangular or tapered profile. Additionally or alternatively, the walls 71 may not extend from the lower wall 70 but from the front wall 40 of the container body 31 or the main body 431. According to a further modification, just one of the two walls 71 is provided, for example the one on the left wall 54 or the one on the right wall 55.

Still further, the grooves 74 are described in the embodiment or the respective modifications as having an upwardly facing lower surface 74L, a downwardly facing upper surface 74U and a (bottom) surface 74M connecting surfaces 74L, 74U. However, according to modified embodiments, there may be present only the bottom surface 74M and the downwardly facing upper surface 74U, or only bottom surface 74M and the upwardly facing lower surface 74L. If there is neither a downwardly facing upper surface 74U nor an upwardly facing lower surface 74L, there may also be no provided groove 74 at all, even if the first and second key portions 77, 78 are present. In a further modification, there is a groove 74 only on one side of the cartridge 30, e.g., the left wall 54 side, but not on the other side, e.g., the right wall 55 side, or vice versa. In a still further modification, there is only an upwardly facing lower surface 74L formed on one side, e.g., left wall 54 side, and only formed a downwardly facing upper surface 74U on the other side, e.g., the right wall 55 side, or vice versa, but no opposing surfaces 74U, 74L of a groove 74, respectively.

According to a further modification, the groove or grooves 74 may not have a U-shaped profile but for example a V-shaped profile having opposite surfaces 74L, 74U, which each face each other with slightly inclined directions with respect to the up-down-direction. Any other profile is possible as well. Also, the flat (bottom) surface 74M connecting surfaces 74L, 74U may be omitted or replaced with a rounded, concave or even convex bottom surface 74M connecting the opposite surface 74L, 74U. If the flat (bottom) surface 74M connecting surfaces 74L, 74U is omitted, the groove 74, or the grooves 74, are formed by an aperture extending in the left wall 54 and/or the right wall 55 in the front rear direction.

In the embodiment shown in the FIGS. 1-17, there is described that the main body comprises a container body 31 and a cover 32. Both are connected to each other via protrusions 52 and through holes 58 accommodating the protrusions 52 with some play to allow for slight and limited rotation of the cover 32 with respect to the container body 31. However, in such case of two members 31, 32, according to modifications these may be connected with each other via other hinged mechanisms allowing for rotation, or they are connected with each other without play, thus not allowing for rotation.

In the embodiment, the second key portion 78 is described to be integrally formed on the upper wall 44. According to modifications, however, the second key portion 78 may also be formed as a separate part on or in the upper wall 44. In a further modification, the second key portion 78 may be resiliently retractable in a vertical or inclined direction. For example, during insertion, the second key portion may be pushed down by the locking portion 139 (e.g., without rotation of the container body 31 in FIGS. 1-17, or the main body 431 in FIG. 18) to be retracted in a recess formed in the upper wall 44, while the locking portion 139 slides on the inclined surface 84B.

Thereby, the second key portion may for example be spring-biased in an upward direction. Once the locking portion 139 has passed the inclined surface 84B and the end surface 86, if present, the second key portion moves upwards again by action of its spring force and snaps into the second receiving portion (second key slot 138), if it fits or matches thereto. At the same time, the locking surface 87 comes into contact with locking portion 139. The cartridge is then firmly held in place in the slot 108.

Depending on the (steeper) inclination of the locking surface 87, the cartridge may afterwards, e.g., after consumption of ink, be removed from the slot 108 by applying a somewhat larger force such as to overcome friction between the locking portion 139 and the locking surface 87. In that case, the second key portion is retracted again during removal. Note, that in case the second key portion does not match the second key slot 138 during insertion, the lock surface 87 cannot be brought in contact with the locking portion 139 and the cartridge is not held in position, so that the user recognizes that the cartridge 30 was inserted into the wrong slot 108.

In the above embodiment or its modifications, the third key portion 79 is described as a concave portion formed within the left wall 54 and the right wall 55, respectively. However, according to a further modification of the cartridge 30, the cover 32 may be formed having a thickness between the left wall 54 and the right wall 55 without a concave recess such that it fits between the fitting pieces 122, 123. Such modification is an embodiment of the cartridge 30, where a third portion is omitted. However, it is also possible that a concave recess is formed on only one side, e.g., only in the left wall 54 or in the right wall 55 but not on the other side.

In the above embodiments shown in FIGS. 1-18 or its modifications, the rear end of the upper surface 80 of the upper wall 44 of the container body 31 includes an operation surface 68, and the operation surface 68 has a plurality of protrusions 69 that protrude upward and extend along the left-right direction, wherein the protrusions 69 are an example of an anti-slip structure. However, according to a modification of the embodiments, the operation surface may be arranged differently, e.g., with depressions instead of protrusions, or may even be omitted.

According to one aspect, there is provided an ink container configured to be insertable into an attachment space of an attachment unit, the ink container comprising: a left surface facing leftward and a right surface facing rightward in a left-right direction, a supply port configured to receive a supply tube provided in the attachment space for retrieving ink from a chamber, the supply port facing frontward in a front-rear direction orthogonal to the left-right direction.

The ink container further has a lower surface positioned upward, in an up-down direction orthogonal to the left-right direction and the front-rear direction, and frontward of the supply port and a guide wall that includes a left guide surface facing leftward and a right guide surface facing rightward. Here, the guide wall has a front end positioned frontward of the supply port and rearward of a front end of the ink container, Further, the guide wall has a lower end positioned upward of the supply port and downward of the lower surface, Moreover, the left guide surface is positioned rightward of the left surface, and the right guide surface is positioned leftward of the right surface.

Due this configuration, since the left guide surface of the guide wall is positioned further to the right than the left surface of the ink container, the right guide surface of the guide wall is positioned further to the left than the right surface of the ink container, and the front end of the guide wall is positioned further to the rear than the front end of the ink container, direct collision of the guide wall with the floor or the like is suppressed when the ink container falls onto the floor or the like.

According to a further embodiment of the ink container, the guide wall extends downward from the lower surface. Such feature provides advantages in terms of increased support and stability of the guide wall.

According to a further embodiment of the ink container, the ink container includes a front surface that extends downward from a rear end of the lower surface, and the guide wall extends frontward from the front surface. Since the guide wall is connected to the lower surface and the front surface, the strength of support and stability is further increased.

According to a further embodiment of the ink container, the left guide surface is positioned rightward of a left end of the supply port, and the right guide surface is positioned leftward of a right end of the supply port. Due to this configuration, the two guide surfaces may be restricted to be positioned closer to a sagittal plane which is defined to divide the body into right and left sections. Thus, when the ink container falls onto a floor or the like, the guide wall is further prevented from directly colliding with the floor or the like.

According to a further embodiment of the ink container, the guide wall has a first length in the up-down direction and a second length in the front-rear direction, and the first length is smaller than the second length. Thus, the side surface of the guide wall can more easily guide the ink container in the front-rear direction than in the up-down direction, and provides a sufficient length for guiding in the insertion direction.

According to a further embodiment of the ink container, a distance between the left guide surface and the right guide surface is smaller than a distance between the left surface and the right surface. It may mean that a thickness of the guide wall in the left-right-direction is smaller than a thickness of the ink container. The same advantages as noted above can be achieved.

According to a further embodiment of the ink container, the ink container includes a first member, which includes a chamber configured to store ink, the supply port is provided at a front end of an supply portion, which extends frontward from the chamber, the supply portion has an outer surface that defines a lower edge of the main body, and the outer surface of the supply portion has a curved surface curved in a circumferential direction around an axis of the supply port parallel to the front-rear direction.

According to a further embodiment of the ink container, in an upright posture obtained in a position when the ink container is installed in the attachment unit, the lower surface is inclined such that a rear end of the lower surface is positioned downward of a front end of the lower surface, when viewed in the up-down direction.

Accordingly, in an upright posture obtained in a position when the ink container is installed in the attachment unit, the front end side of the lower end of the guide wall is positioned higher than the rear end side, and thus the front end of the guide wall of the ink container easily enters the attachment unit.

According to a further embodiment of the ink container, the ink container further comprises an electrical interface having a plurality of electrodes facing upward, wherein the plurality of electrodes are positioned upward of the guide wall and aligned in the left-right direction. Since the guide wall suppresses the ink container from rotating around the axis line along the front-rear direction, the pressure at which the contact point of the attachment unit comes into contact with the plurality of electrodes of the electrical interface is suppressed from becoming uneven. As a result, the electrical conduction between the contact of the attachment unit and the electrode is stabilized.

According to a further embodiment of the ink container, the guide wall and at least a part of the plurality of electrodes overlap in the up-down direction. As a consequence, a force exerted, e.g. by spring-biased electrical contacts contacting the electrodes, may be provided with an upwardly directed counter force due to guiding process of the guide wall during insertion, so that the electrical connection between the electrodes and the contacts is improved.

According to a further embodiment of the ink container, the ink container further comprises a valve configured to open and close the supply port and, in an attached state where the ink container is attached to the attachment unit, contact the supply tube of the attachment unit. The ink container further comprises a biasing member configured to bias the valve frontward, and an electrical interface having an electrode facing upward. Additionally, the ink container comprises a contact surface positioned upward and rearward of the supply port and configured to rearwardly contact the attachment unit in the attached state, and the guide wall receives an upward biasing force in the attached state. Here, advantages mentioned above are further enhanced.

According to a further embodiment of the ink container, the ink container further comprises a guide groove that extends in the front-rear direction on the left surface or the right surface, wherein the guide groove has an upper surface facing downward and a lower surface facing the upper surface, and the guide groove is positioned upward of a lower end of the guide wall.

Accordingly, in the process in which the ink container enters the attachment unit, excessive movement of the ink container in the left-right direction is regulated by the side surface of the guide wall. In addition, excessive movement of the ink container in the up-down direction is restricted by the upper surface and the lower surface of the guide groove. Therefore, the ink container is smoothly guided by the guide wall and the guide groove until the mounting is completed.

According to a further embodiment of the ink container, the ink container further comprises a first wall that extends downward from the lower surface, and a second wall that extends downward from the lower surface, wherein the guide wall is positioned between the first wall and the second wall in the left-right direction. As a consequence, the guide wall is even further protected by the first wall and the second wall.

According to a further embodiment of the ink container, the ink container includes a first member having the supply port and a second member positioned frontward of the first member and having the lower surface and the guide wall. The first member is movable relative to the second member, and the first member further includes a contact surface configured to rearwardly contact the attachment unit.

According to another aspect of the disclosure, there is provided a system comprising an attachment unit and an ink container, wherein the ink container is frontwardly attachable into the attachment unit.

The ink container includes a left surface facing left and a right surface facing right in a left-right direction, a supply portion that includes a supply port facing frontward in a front-rear direction orthogonal to the left-right direction, a lower surface positioned upward, in an up-down direction orthogonal to the left-right direction and the front-rear direction, and frontward of the supply port, and a guide wall that has a left guide surface facing leftward and a right guide surface facing rightward. A front end of the guide wall is positioned frontward of the supply port and rearward of a front end of ink container. A lower end of the guide wall is positioned upward of the supply port and downward of the lower surface. The left guide surface is positioned rightward of the left surface. The right guide surface is positioned leftward of the right surface.

Moreover, the attachment unit includes: an attachment space in which the ink container is to be accommodated, a supply tube to be connected to the supply port, and a receiving portion that opens rearward and upward and is configured to receive the guide wall. The advantages achieved hereby are the same as denoted above.

According to a further embodiment of the system according to this aspect, the attachment unit further includes a second biasing member configured to apply an upward biasing force to the guide wall when the ink container is attached to the attachment space.

According to the present disclosure, the guide wall is less likely to be damaged even when the ink container falls onto the floor.

What is claimed is:

1. An ink container comprising:

a main body including a chamber configured to store ink, the main body having a first sidewall and a second sidewall, the first and second sidewalls spaced apart from one another to define a first width;

a supply port facing frontward in an attachment direction of the ink container and configured to supply ink from the chamber;

a lower surface positioned above the supply port in an up-down direction, and forward of the supply port in the attachment direction of the ink container; and a guide wall defining a second width smaller than the first width, wherein:

the guide wall has a front end positioned forward of the supply port and rearward of a front end of the ink container in the attachment direction, the guide wall has a lower end positioned above the supply port and below the lower surface in the up-down direction, and the guide wall has a first guide surface positioned inward from the first sidewall of the main body and an opposing second guide surface positioned inward of the second sidewall of the main body such that the guide wall and each of the first and second guide surfaces is positioned within the first width defined by the first and second sidewalls.

2. The ink container according to claim 1, wherein the guide wall extends downward from the lower surface.

3. The ink container according to claim 1, further comprising a front surface that extends downward from a rear end of the lower surface, wherein the guide wall extends frontward from the front surface in the attachment direction.

4. The ink container of claim 1, further comprising a supply portion including the supply port, the supply portion extending in the attachment direction.

5. The ink container of claim 4, wherein the supply portion has an outer surface that defines a lower edge of the main body.

6. The ink container of claim 5, wherein the outer surface of the supply portion has a curved surface curved in a circumferential direction around a central axis of the supply port.

7. The ink container of claim 6, wherein the curved surface defines a first diameter that is equal to the third width.

8. The ink container of claim 4, wherein the supply portion defines a third width, and wherein the guide wall is positioned within the third width defined by the supply port.

9. The ink container of claim 1, wherein the guide wall has a first length in the up-down direction and a second length in the attachment direction, and the first length is smaller than the second length.

10. The ink container of claims 1, wherein the lower surface is inclined such that a rear end of the lower surface in the attachment direction is positioned downward of a front end of the lower surface.

11. The ink container of claim 1, further comprising an electrical interface positioned upward of the guide wall.

12. The ink container of claim 1, further comprising a guide groove that extends in the attachment direction along one of the first sidewall or the second sidewall of the main, wherein the guide groove is positioned upward of a lower end of the guide wall.

13. The ink container of claim 1, further comprising a first wall that extends downward from the lower surface; and a second wall that extends downward from the lower surface, wherein the guide wall is positioned between the first wall and the second wall.

14. The ink container of claim 1, further comprising a first member having the supply port;

a second member positioned frontward of the first member in the attachment direction and having the lower surface and the guide wall, wherein the first member is movable relative to the second member.

15. A printing system comprising:

an attachment unit; and an ink container configured to be attached to the attachment unit, the ink container comprising:

a main body including a chamber configured to store ink, the main body having first and second sidewalls spaced apart from one another to define a first width;

a supply port facing frontward in an attachment direction of the ink container and configured to supply ink from the chamber;

a lower surface positioned above the supply port in an up-down direction, and forward of the supply port in the attachment direction of the ink container; and a guide wall defining a second width smaller than the first width, wherein:

the guide wall has a front end positioned forward of the supply port and rearward of a front end of the ink container in the attachment direction, the guide wall has a lower end positioned above of the supply port and below the lower surface in the up-down direction, and the guide wall has a first guide surface positioned inward from the first sidewall of the main body and an opposing second guide surface positioned inward of the second sidewall of the main body such that the guide wall and each of the first and second guide surfaces is positioned within the first width defined by the first and second sidewalls.

16. The printing system of claim 15, wherein the attachment unit includes:

an attachment space configured to receive the ink container;

a receiving portion that defines an opening receiving the guide wall when the ink container is received in the attachment space.

17. The printing system of claim 16, wherein the attachment unit further includes a second biasing member configured to apply an upward biasing force to the guide wall when the ink container is received in the attachment space.

18. The printing system of claim 16, wherein the receiving portion comprises a slot that receives the guide wall when the ink container is received in the attachment space.

19. The printing system of claim 18, wherein the attachment unit includes first and second protruding pieces protruding upwardly from a surface of the attachment unit, wherein the first and second protruding pieces are spaced apart from one another to form the slot that receives the guide wall when the ink container is received in the attachment space.

20. An ink container comprising:

a main body including a chamber configured to store ink, the main body having first and second sidewalls spaced apart from one another to define a first width;

a supply port facing frontward in an attachment direction of the ink container and configured to supply ink from the chamber;

a lower surface positioned above the supply port in an up-down direction, and forward of the supply port in the attachment direction of the ink container; and a guide wall defining a second width smaller than the first width, wherein:

the guide wall has a front end positioned forward of the supply port and rearward of a front end of the ink container in the attachment direction, the guide wall has a lower end positioned above the supply port and below the lower surface in the up-down direction, the guide wall is positioned within the first width defined by the first and second sidewalls, and the lower surface is inclined such that a rear end of the lower surface in the attachment direction is positioned downward of a front end of the lower surface.

* * * * *